US012463769B2

(12) United States Patent
Chai et al.

(10) Patent No.: US 12,463,769 B2
(45) Date of Patent: Nov. 4, 2025

(54) METHOD FOR CONFIGURING REFERENCE SIGNAL

(71) Applicant: HUAWEI TECHNOLOGIES CO., LTD., Shenzhen (CN)

(72) Inventors: Xiaomeng Chai, Shanghai (CN); Yiqun Wu, Shanghai (CN); Yan Sun, Shanghai (CN); Jing Liang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 333 days.

(21) Appl. No.: 18/336,764

(22) Filed: Jun. 16, 2023

(65) Prior Publication Data
US 2023/0336302 A1 Oct. 19, 2023

Related U.S. Application Data

(63) Continuation of application No. PCT/CN2020/137535, filed on Dec. 18, 2020.

(51) Int. Cl.
*H04L 5/00* (2006.01)
(52) U.S. Cl.
CPC ................... *H04L 5/0048* (2013.01)
(58) Field of Classification Search
CPC ............. H04L 5/0048; H04L 25/0226; H04L 25/0254; H04L 27/2613; H04W 4/00
See application file for complete search history.

(56) References Cited

U.S. PATENT DOCUMENTS

2021/0022094 A1* 1/2021 Luo .................. H04W 24/10
2021/0211252 A1* 7/2021 Zhao ................. H04W 4/40

FOREIGN PATENT DOCUMENTS

CN 111865845 A 10/2020

OTHER PUBLICATIONS

"3rd Generation Partnership Project; Technical Specification Group Radio Access Network; NR; Radio Resource Control (RRC) protocol specification (Release 16)," 3GPP TS 38.331 V16.2.0, total 921 pages, 3rd Generation Partnership Project, Valbonne, France (Sep. 2020).

(Continued)

*Primary Examiner* — Kyaw Z Soe
(74) *Attorney, Agent, or Firm* — Leydig, Voit & Mayer, Ltd.

(57) ABSTRACT

Embodiments of this application provide a method for configuring a reference signal, to increase a rate of data transmission between an access network device and a terminal device. The method includes: An access network device determines a first reference signal pool, where the first reference signal pool includes one or more reference signals. The access network device sends first information to a first terminal device, where the first information indicates a first reference signal allocated to the first terminal device, the first reference signal is included in the first reference signal pool, and the first reference signal pool is obtained by the access network device by training a first neural network, or the first reference signal pool is obtained by another network-side node by training a first neural network and sent to the access network device.

20 Claims, 5 Drawing Sheets

(56) References Cited

OTHER PUBLICATIONS

Mashhadi et al., "Pruning the Pilots: Deep Learning-Based Pilot Design and Channel Estimation for MIMO-OFDM Systems," arXiv: 2006.11796v2, XP081878693, total 20 pages (Jul. 23, 2020).
"3rd Generation Partnership Project; Technical Specification Group Radio Access Network; NR; Physical channels and modulation (Release 16)," 3GPP TS 38.211 V16.3.0, total 133 pages, 3rd Generation Partnership Project, Valbonne, France (Sep. 2020).
Huang et al., "Throughput Optimization for Grant-Free Multiple Access With Multiagent Deep Reinforcement Learning," IEEE Transactions on Wireless Communications, vol. 20, No. 1, XP011831252, total 15 pages, Institute of Electrical and Electronics Engineers, New York, New York (Jan. 2021).
"3rd Generation Partnership Project; Technical Specification Group Radio Access Network; NR; Physical layer procedures for control (Release 16)," 3GPP TS 38.213 V16.3.0, total 179 pages, 3rd Generation Partnership Project, Valbonne, France (Sep. 2020).
Luo et al., "Pilot Allocation Game: A Monte Carlo Tree Based Method," 2019 International Conference on Information and Communication Technology Convergence (ICTC), XP033678486, total 6 pages, Institute of Electrical and Electronics Engineers, New York, New York (Oct. 16, 2019).
Ma et al., "Data-Driven Deep Learning to Design Pilot and Channel Estimator for Massive MIMO," IEEE Transactions on Vehicular Technology, vol. 69, No. 5, XP011788365, total 6 pages, Institute of Electrical and Electronics Engineers, New York, New York (May 2020).

\* cited by examiner

METHOD FOR CONFIGURING REFERENCE SIGNAL

CROSS-REFERENCE TO RELATED APPLICATIONS

This application is a continuation of International Application No. PCT/CN2020/137535, filed on Dec. 18, 2020, the disclosure of which is hereby incorporated by reference in its entirety.

TECHNICAL FIELD

This application relates to the field of communication technologies, and in particular, to a method for configuring a reference signal.

BACKGROUND

In a wireless communication system, uplink data transmission may be performed between an access network device and a terminal device, for example, the terminal device sends uplink data to the access network device; and/or downlink data transmission may be performed between an access network device and a terminal device, for example, the access network device sends downlink data to the terminal device. How to increase a rate of data transmission between the access network device and the terminal device is a current research hotspot.

SUMMARY

Embodiments of this application provide a method for configuring a reference signal, to increase a rate of data transmission between an access network device and a terminal device.

According to a first aspect, a method for configuring a reference signal is provided. The method describes a function of a terminal device side. The method includes: receiving first information from an access network device. The first information indicates a first reference signal allocated to a first terminal device. The first reference signal is included in a first reference signal pool, and the first reference signal pool includes one or more reference signals.

In the foregoing method, a candidate reference signal is obtained through a neural network. Because the neural network can effectively resolve a complex high-dimension problem, through the method, a reference signal meeting a quantity requirement and a performance requirement can be obtained, so that a data transmission rate can be improved.

In an embodiment, the first reference signal pool is obtained by training a first neural network.

In an embodiment, the first information includes a sequence value of the first reference signal. Alternatively, the first information includes a compressed value of a sequence value of the first reference signal. Alternatively, the first information includes an offset value of a sequence value of the first reference signal relative to a sequence value of a reference signal previously configured for the first terminal device. Alternatively, the first information includes a compressed value of an offset value of a sequence value of the first reference signal relative to a sequence value of a reference signal previously configured for the first terminal device. Alternatively, the first information indicates an index of the first reference signal pool in M1 reference signal pools and an index of the first reference signal in the first reference signal pool, where M1 is an integer greater than or equal to 1. Alternatively, the first information indicates an index of the first reference signal pool in M1 reference signal pools, an index of a reference signal group to which the first reference signal belongs in the first reference signal pool, and an index of the first reference signal in the reference signal group, where M1 is an integer greater than or equal to 1.

In an embodiment, the method further includes: receiving information about the M1 reference signal pools from the access network device. Optionally, the information about the M1 reference signal pools indicates sequence values and indexes of reference signals included in each reference signal pool.

Through the method, the first reference signal can be effectively indicated.

According to a second aspect, a method for configuring a reference signal is provided. The method describes a function of an access network device side. The method includes: determining a first reference signal pool, where the first reference signal pool includes one or more reference signals; and sending first information to a first terminal device. The first information indicates a first reference signal allocated to the first terminal device, and the first reference signal is included in the first reference signal pool.

Optionally, the first reference signal pool is obtained by the access network device by training a first neural network. Alternatively, the first reference signal pool is obtained by an AI node by training a first neural network, and is sent to the access network device.

Optionally, information about the first reference signal pool may be agreed on in a protocol after offline training, or may be sent by the access network device to a terminal device.

For beneficial effects of the method, refer to the first aspect. Details are not described herein again.

For a method for indicating the first reference signal by the first information, refer to the first aspect. Details are not described herein again.

In an embodiment, the determining a first reference signal pool includes: determining the first reference signal pool from M1 reference signal pools based on first feature information of N1 terminal devices. The first terminal device is included in the N1 terminal devices. The M1 reference signal pools are obtained by training the first neural network. M1 is an integer greater than or equal to 1, and N1 is an integer greater than or equal to 2.

Through the method, a corresponding candidate reference signal may be selected based on feature information of the terminal devices, so that the selected candidate reference signal can better match a channel environment, thereby improving a data transmission rate.

In an embodiment, for each reference signal pool in the M1 reference signal pools, the reference signal pool is obtained by training the first neural network based on a training parameter and a training sample set. The training parameter includes one or more of the following parameters: a quantity of reference signals in the reference signal pool, a sequence length of the reference signal in the reference signal pool, a sequence value range of the reference signal in the reference signal pool, grouping information of the reference signal in the reference signal pool, and a performance requirement of the reference signal in the reference signal pool. The training sample set includes P1 training samples. Each training sample includes one or more of the following parameters of each of N2 terminal devices: channel information and a data transmission state. P1 is an integer greater than or equal to 1, and N2 is an integer greater than or equal to 1.

Optionally, the channel information is agreed on in a standard. Alternatively, the channel information is obtained through uplink measurement. Alternatively, the channel information is received from the N2 terminal devices. Alternatively, the channel information is obtained through inference by using a second neural network.

Optionally, the first feature information of the N1 terminal devices includes one or more of the following information of each terminal device: location information, service feature information, data transmission state information, and channel information.

Through the method, a plurality of candidate reference signal pools may be trained based on feature information of the terminal devices, so that the trained candidate reference signal pools can match various channel environments, thereby improving robustness of a reference signal.

In an embodiment, the reference signal pool is obtained by training the first neural network based on a training parameter and a training sample set. The training parameter includes one or more of the following parameters: a quantity of reference signals in the reference signal pool, a sequence length of the reference signal in the reference signal pool, a sequence value range of the reference signal in the reference signal pool, grouping information of the reference signal in the reference signal pool, and a performance requirement of the reference signal in the reference signal pool. The training sample set includes P2 training samples. Each training sample includes one or more of the following parameters of each of N1 terminal devices: channel information and a data transmission state. The first terminal device is included in the N1 terminal devices. P2 is an integer greater than or equal to 1, and N1 is an integer greater than or equal to 2.

Optionally, the method further includes: receiving an uplink signal from each of the N1 terminal devices, and estimating the channel information of each terminal device in the N1 terminal devices based on the received uplink signal.

Through the method, the first reference signal pool can be trained based on feature information of a plurality of terminal devices that perform resource multiplexing with the first terminal device, so that the trained first reference signal pool can match channel environments of the plurality of terminal devices, thereby improving a transmission rate during data transmission between the access network device and the plurality of terminal devices.

In an embodiment, that the first reference signal pool is obtained by training a first neural network includes: The first reference signal pool is obtained through a first process. The first process includes the following operations. Operation 1: Receive N1 reference signals from N1 terminal devices, where each terminal device corresponds to one reference signal. Operation 2: Determine N1 updated reference signals of the N1 reference signals based on reception information of the N1 reference signals by using the first neural network. Operation 3: Separately indicate an updated reference signal of each terminal device to at least one terminal device in the N1 terminal devices. Operation 4: Stop the first process when it is determined that a first condition is met, where the N1 updated reference signals constitute the first reference signal pool; or otherwise, perform operation 1 again.

Optionally, the first condition includes: A quantity of iterations of the first process meets a threshold requirement. Alternatively, duration of the first process meets a threshold requirement. Alternatively, in the first process, a quantity of transmissions of the reference signal meets a threshold requirement. Alternatively, in the first process, a quantity of undetected reference signals meets a threshold requirement. Alternatively, in the first process, a missing detection rate of the reference signal meets a threshold requirement. Alternatively, in the first process, a quantity of falsely alarmed reference signals meets a threshold requirement. Alternatively, in the first process, a false alarm rate of the reference signal meets a threshold requirement.

Through the method, the first reference signal pool can be trained based on feature information of a plurality of terminal devices that perform resource multiplexing with the first terminal device, so that the trained first reference signal pool can match channel environments of the plurality of terminal devices, thereby improving a transmission rate during data transmission between the access network device and the plurality of terminal devices. This method can be considered as online training.

In an embodiment, the method further includes: sending second information to a second terminal device. The second information indicates a second reference signal allocated to the second terminal device. The second reference signal is included in the first reference signal pool. The first terminal device and the second terminal device are included in the N1 terminal devices. When the first terminal device and the second terminal device belong to a same terminal device group in the N1 terminal devices, the first reference signal and the second reference signal belong to a same reference signal group in the first reference signal pool. Alternatively, when the first terminal device and the second terminal device belong to different terminal device groups in the N1 terminal devices, the first reference signal and the second reference signal belong to different reference signal groups in the first reference signal pool.

Optionally, the method further includes: determining a terminal device group corresponding to the N1 terminal devices based on the first feature information of the terminal devices. The first feature information of the N1 terminal devices includes one or more of the following information of each terminal device: the location information, the service feature information, the data transmission state information, and the channel information.

Through the method, a correlation value of intra-group reference signals may be low, for example, lower than a threshold. In this way, when reference signals are allocated to a plurality of terminal devices, different reference signals in a same group may be allocated to different terminal devices that are close to each other or that have strong interference. This method helps an access network device distinguish between uplink signals of different terminal devices.

According to a third aspect, a reference signal determining method is provided. The method is for describing a function of an AI node. The method includes: determining a first reference signal pool and indicating configuration information of the first reference signal pool to an access network device. The first reference signal pool includes one or more reference signals. The first reference signal pool is obtained by training a first neural network.

A method for determining (training) the first reference signal pool or training the M1 reference signal pools including the first reference signal pool is the same as that described in the second aspect. Details are not described again.

According to a fourth aspect, an apparatus is provided. The apparatus may be a terminal device, or may be another apparatus that can implement the method described in the first aspect. The another apparatus can be installed in a terminal device, or can be used in a manner of matching the terminal device. In an embodiment, the apparatus may include modules that are in one-to-one correspondence with the methods/operations/steps/actions described in the first aspect. The modules may be implemented through a hardware circuit, software, or a combination of a hardware circuit and software. In an embodiment, the apparatus may include a processing module and a communication module.

In an embodiment, the communication module is configured to: receive first information from an access network device. The first information indicates a first reference signal allocated to a first terminal device. The first reference signal is included in a first reference signal pool, and the first reference signal pool includes one or more reference signals.

Descriptions of the first information are the same as those in the first aspect. Details are not described again.

According to a fifth aspect, an apparatus is provided. The apparatus may be an access network device, or may be another apparatus that can implement the method described in the second aspect. The another apparatus can be installed in an access network device, or can be used in a manner of matching an access network device. In an embodiment, the apparatus may include modules that are in one-to-one correspondence with the methods/operations/steps/actions described in the second aspect. The modules may be implemented through a hardware circuit, software, or a combination of a hardware circuit and software. In an embodiment, the apparatus may include a processing module and a communication module.

In an embodiment, the processing module is configured to determine a first reference signal pool. The first reference signal pool includes one or more reference signals. The communication module is configured to send first information to a first terminal device. The first information indicates a first reference signal allocated to the first terminal device, and the first reference signal is included in the first reference signal pool.

Descriptions of the first information, the method for determining the first reference signal pool, and the like are the same as those in the second aspect. Details are not described again.

According to a sixth aspect, an apparatus is provided. The apparatus may be an AI node, or may be another apparatus that can implement the method described in the third aspect. The another apparatus can be installed in an AI node, or can be used in a manner of matching an AI node. In an embodiment, the apparatus may include modules that are in one-to-one correspondence with the methods/operations/steps/actions described in the third aspect. The modules may be implemented through a hardware circuit, software, or a combination of a hardware circuit and software. In an embodiment, the apparatus may include a processing module and a communication module.

In an embodiment, the processing module is configured to determine a first reference signal pool. The communication module is configured to indicate configuration information of the first reference signal pool to an access network device. The first reference signal pool includes one or more reference signals, and the first reference signal pool is obtained by training a first neural network.

Descriptions of a method for determining (training) the first reference signal pool and the like are the same as those in the third aspect. Details are not described again.

According to a seventh aspect, an embodiment of this application provides an apparatus. The apparatus includes a processor, configured to implement the method described in the first aspect. The apparatus may further include a memory, configured to store instructions. The memory is coupled to the processor, and when executing the instructions stored in the memory, the processor can implement the method described in the first aspect. The apparatus may further include a communication interface, and the communication interface is used by the apparatus to communicate with another device. In related embodiments of this application, the communication interface may be a transceiver, a circuit, a bus, a module, a pin, or a communication interface of another type.

In an embodiment, the apparatus includes:
a memory, configured to store program instructions, and
a processor, configured to use a communication interface to receive first information from an access network device. The first information indicates a first reference signal allocated to a first terminal device. The first reference signal is included in a first reference signal pool, and the first reference signal pool includes one or more reference signals.

Descriptions of the first information are the same as those in the first aspect. Details are not described again.

According to an eighth aspect, an embodiment of this application provides an apparatus. The apparatus includes a processor, configured to implement the method described in the second aspect. The apparatus may further include a memory, configured to store instructions. The memory is coupled to the processor. When executing the instructions stored in the memory, the processor can implement the method described in the second aspect. The apparatus may further include a communication interface, and the communication interface is used by the apparatus to communicate with another device.

In an embodiment, the apparatus includes:
a memory, configured to store program instructions, and
a processor, configured to determine a first reference signal pool, where the first reference signal pool includes one or more reference signals.

The processor sends first information to a first terminal device through a communication interface. The first information indicates a first reference signal allocated to the first terminal device, and the first reference signal is included in the first reference signal pool.

Descriptions of the first information, the method for determining the first reference signal pool, and the like are the same as those in the second aspect. Details are not described again.

According to a ninth aspect, an embodiment of this application provides an apparatus. The apparatus includes a processor, configured to implement the method described in the third aspect. The apparatus may further include a memory, configured to store instructions. The memory is coupled to the processor. When executing the instructions stored in the memory, the processor can implement the method described in the third aspect. The apparatus may further include a communication interface, and the communication interface is used by the apparatus to communicate with another device.

In an embodiment, the apparatus includes:
a memory, configured to store program instructions, and
a processor, configured to determine a first reference signal pool.

The processor indicates the configuration information of the first reference signal pool to an access network device through a communication interface. The first reference signal pool includes one or more reference signals, and the first reference signal pool is obtained by training a first neural network.

Descriptions of a method for determining (training) the first reference signal pool and the like are the same as those in the third aspect. Details are not described again.

According to a tenth aspect, a computer-readable storage medium is provided, including instructions. When the instructions are run on a computer, the computer is enabled to perform the method according to the first aspect, the second aspect, and/or the third aspect.

According to an eleventh aspect, a computer program product is provided, including instructions. When the instructions are run on a computer, the computer is enabled to perform the method according to the first aspect, the second aspect, and/or the third aspect.

According to a twelfth aspect, a chip system is provided. The chip system includes a processor, and may further include a memory, to implement the method according to the first aspect, the second aspect, and/or the third aspect. The chip system may include a chip, or may include a chip and another discrete component.

According to a thirteenth aspect, a communication system is provided, including the apparatus according to the fourth aspect or the seventh aspect, and the apparatus according to the fifth aspect or the eighth aspect, or including the apparatus according to the fourth aspect or the seventh aspect, the apparatus according to the fifth aspect or the eighth aspect, and the apparatus according to the sixth aspect or the ninth aspect.

DESCRIPTION OF EMBODIMENTS

Figure 1:
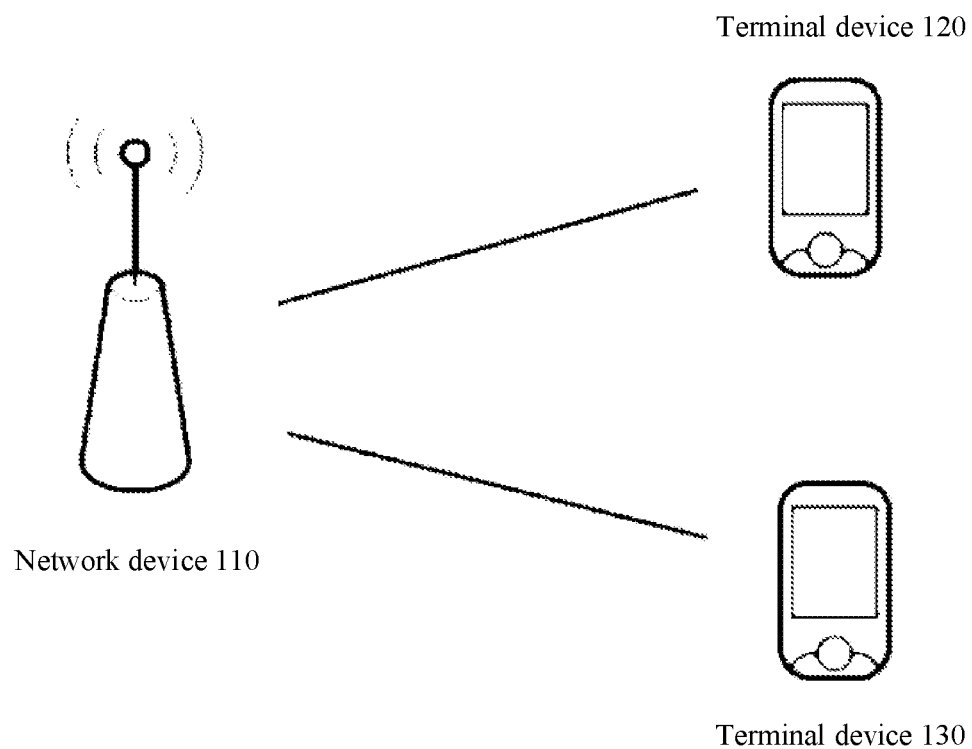
FIG. 1 is a schematic diagram of an architecture of a communication system according to an embodiment of this application.

Technical solutions provided in embodiments of this application may be applied to various communication systems, for example, a long-term evolution (LTE) system, a 5th generation (5G) mobile communication system, a wireless fidelity (Wi-Fi) system, a future communication system (for example, a 6th generation (6G) mobile communication system), or a system integrating a plurality of communication systems. This is not limited in embodiments of this application. 5G may also be referred to as new radio (NR).

The technical solutions provided in embodiments of this application may be applied to various communication scenarios, for example, may be applied to one or more of the following communication scenarios: enhanced mobile broadband (eMBB), ultra-reliable low-latency communication (URLLC), machine-type communication (MTC), massive machine-type communications (mMTC), device-to-device (D2D), vehicle to everything (V2X), vehicle to vehicle (V2V), the Internet of things (IoT), and the like.

The technical solutions provided in embodiments of this application may be applied to communication between communication devices. Communication between communication devices may include communication between a network device and another network-side node (for example, a node configured to implement an artificial intelligence function), communication between a network device and a terminal device, communication between network devices, and/or communication between terminal devices. In embodiments of this application, the term "communication" may also be described as "transmission", "information transmission", "signal transmission", "data transmission", or the like. The transmission may include sending and/or receiving. In embodiments of this application, the communication between the network device and the terminal device is used as an example to describe the technical solutions. A person skilled in the art may also apply the technical solutions to communication between another scheduling entity and another subordinate entity, for example, communication between a macro base station and a micro base station, for example, communication between a first terminal device and a second terminal device. The scheduling entity may allocate a resource to the subordinate entity. For example, the resource includes a link resource and/or an air interface resource. The air interface resources include one or more of the following resources: a time domain resource, a frequency domain resource, a code resource, and a spatial resource. In embodiments of this application, "a plurality of types" may be two types, three types, four types, or more types. This is not limited in embodiments of this application.

In embodiments of this application, the communication between the network device and the terminal device includes: The network device sends a downlink signal/downlink information to the terminal device, and/or the terminal device sends an uplink signal/uplink information to the network device.

In embodiments of this application, "/" may represent an "or" relationship between associated objects. For example, A/B may represent A or B. The term "and/or" may be used to indicate that there are three relationships between the associated objects. For example, A and/or B may represent the following three cases: Only A exists, both A and B exist, and only B exists. A and B may be singular or plural. In embodiments of this application, the term, such as "first", "second", "A", or "B", may be used to distinguish between technical features with a same or similar function. The term, such as "first", "second", "A", or "B", does not limit a quantity and an execution sequence, and the term, such as "first", "second", "A", or "B", does not indicate a definite difference either. In embodiments of this application, terms such as "exemplary" or "for example" are used to represent giving an example, an illustration, or a description. Any embodiment or design scheme described with "exemplary" or "for example" should not be explained as being more preferred or having more advantages than another embodiment or design scheme. Use of the terms such as "exemplary" or "for example" is intended to present a related concept in a specific manner for ease of understanding.

FIG. 1 is a schematic diagram of an architecture of a communication system according to an embodiment of this application. As shown in FIG. 1, the communication system includes a network device 110, a terminal device 120, and a terminal device 130. The terminal devices 120 and 130 may access the network device 110, and communicate with the network device 110. FIG. 1 is merely a schematic diagram. Quantities of network devices and terminal devices included in the communication system are not limited in embodiments of this application. Optionally, the communication system may further include a node (not shown) configured to implement an artificial intelligence (artificial intelligence, AI) function. The node may communicate with the network device 110.

The terminal device in this embodiment of this application may also be referred to as a terminal, and may be a device having a wireless transceiver function. The terminal may be deployed on land, including an indoor device, an outdoor device, a handheld device, and/or an in-vehicle device, may be deployed on a water surface (for example, on a ship), or may be deployed in air (for example, on an airplane, a balloon, or a satellite). The terminal device may be a user equipment (UE). The terminal device includes a handheld device, an in-vehicle device, a wearable device, or a computing device having a wireless communication function. For example, the terminal device may be a mobile phone (mobile phone), a tablet computer, or a computer having a wireless transceiver function. The terminal device may also be a virtual reality (VR) terminal device, an augmented reality (AR) terminal device, a wireless terminal in industrial control, a wireless terminal in unmanned driving, a wireless terminal in telemedicine, a wireless terminal in a smart grid, a wireless terminal in a smart city, a wireless terminal in a smart home, and/or the like.

In this embodiment of this application, an apparatus configured to implement a function of the terminal device may be a terminal device, or may be an apparatus that can support the terminal device in implementing the function, for example, a chip system. The apparatus may be mounted in a terminal device or used in a manner of matching a terminal device. In this embodiment of this application, the chip system may include a chip, or may include a chip and another discrete component. In the following embodiment, technical solutions provided in embodiments of this application are described by using an example in which an apparatus configured to implement the function of the terminal device is a terminal device, and the terminal device is UE.

The network device in embodiments of this application includes a base station (BS), and may be a device that is deployed in a radio access network (RAN) and that can communicate with a terminal device. Optionally, the radio access network may also be referred to as an access network for short. The network device may also be referred to as an access network device. The base station may be in a plurality of forms, for example, a macro base station, a micro base station, a relay station, or an access point. The base station in this embodiment of this application may be a base station in a 5G system, a base station in an LTE system, or a base station in another system. This is not limited. The base station in the 5G system may also be referred to as a transmission reception point (TRP) or a next generation NodeB (gNB or gNodeB). The base station in embodiments of this application may be an integrated base station, or may be a base station including a central unit (CU) and a distributed unit (DU). The base station including a CU and a DU may also be referred to as a base station with a CU and a DU that are separated. For example, the base station includes a gNB-CU and a gNB-DU. The CU may be further separated into a CU control plane (CU-CP) and a CU user plane (CU-CP). For example, the base station includes a gNB-CU-CP, a gNB-CU-UP, and a gNB-DU.

In embodiments of this application, an apparatus configured to implement a function of the network device may be a network device, or may be an apparatus that can support the network device in implementing the function, for example, a chip system. The apparatus may be mounted in a network device or used in a manner of matching a network device. In the following embodiments, technical solutions provided in embodiments of this application are described by using an example in which the apparatus for implementing the function of the network device is a network device, and the network device is a base station.

In a communication system, uplink transmission and/or downlink transmission may be performed between UE and a base station. For example, uplink preconfigured grant transmission may be performed between the UE and the base station. In related embodiments of this application, the uplink preconfigured grant transmission may also be referred to as preconfigured grant transmission for short. In the preconfigured grant transmission, uplink transmission of the UE does not need to be triggered by scheduling performed by the base station. When the UE needs to perform uplink transmission, the UE uses a preconfigured resource to send uplink data to the base station. The preconfigured resource may also be referred to as a grant-free resource. The preconfigured grant transmission may also be referred to as grant-free transmission or scheduling-free transmission.

For example, in the preconfigured grant transmission, the base station may allocate one or more time-frequency resources to the UE. The base station may allocate one time-frequency resource to one or more UEs. For each UE in the one or more UEs, the base station may configure reference signal (RS) information for the UE, so that the UE sends a corresponding reference signal when performing uplink transmission on the time-frequency resource, or the UE assists the base station in performing uplink measurement on the time-frequency resource. When the base station allocates one time-frequency resource to a plurality of UEs, the base station configures different uplink reference signals for the plurality of UEs as far as possible. Through the method, the base station can correctly identify uplink transmission of each UE. The reference signal may also be referred to as a pilot. For example, the uplink transmission is a physical uplink shared channel (PUSCH), and the reference signal is a demodulation reference signal (DMRS) of the PUSCH. Through the foregoing method, for one time-frequency resource allocated to a plurality of UEs, when sending PUSCHs to the base station on the time-frequency resource, the plurality of UEs may send different DMRSs to the base station. In this case, the base station may identify, by detecting the DMRSs, which UEs send uplink transmission (that is, perform activity detection on the UEs). For example, if detecting or receiving a specific DMRS, the base station considers that UE corresponding to the DMRS is active, or considers that a data transmission state of the UE is Active, that is, considers that the UE sends a PUSCH to the base station. If the base station does not detect or receive a specific DMRS, the base station considers that UE corresponding to the DMRS is inactive, or considers that a data transmission state of the UE is Inactive or Deactivated, that is, considers that the UE does not send a PUSCH to the base station. In addition, the base station may perform channel estimation based on a received DMRS, and may correctly receive a corresponding PUSCH based on a channel estimation result.

With the development of communication scenarios and the sharp increase of the quantity of users, the quantity of UEs that use the preconfigured grant transmission increases significantly. Under the condition of a limited quantity of time-frequency resources, the quantity of UEs corresponding to each time-frequency resource increases significantly. However, the quantity of reference signals is limited, and this condition limits the quantity of UEs that can be accommodated on one time-frequency resource, and consequently, limits a system transmission rate. Therefore, for a same time-frequency resource, to allocate different reference signals to UEs, reference signals may be expanded to increase the quantity of reference signals, thereby improving a data transmission rate.

The foregoing technical problem is similar to that in downlink transmission between the base station and the UE and/or uplink transmission based on dynamic scheduling between the base station and the UE. With the development of the communication scenarios and the sharp increase of the quantity of users, information that needs to be exchanged between the base station and the UE may significantly increase. Therefore, to multiplex more data on a same time-frequency resource to improve a data transmission rate, the reference signals may be expanded to increase the quantity of reference signals. For ease of description, embodiments of this application are described by using uplink preconfigured grant transmission as an example.

In an embodiment, a sequence type of a reference signal is a non-orthogonal gold sequence or a Zadoff-Chu (ZC) sequence. However, the quantity of ZC sequences is limited by a length of the ZC sequences. When the quantity of UEs is greater than the quantity of reference signals that can be supported by the ZC sequences, the base station cannot allocate a unique reference signal to each UE. Although there are a large quantity of gold sequences, cross-correlation between different gold sequences is high, and it is difficult to distinguish between different reference signals at a receive end, and transmission performance is poor.

Based on this, embodiments of this application provide the following method for configuring a reference signal. In the method, a network side generates at least one candidate reference signal through a first neural network, and the base station configures, for UE, a reference signal of the UE in the at least one candidate reference signal. A network element configured to generate the at least one candidate reference signal through the first neural network may be a base station, a CU in the base station, or another network element that is on the network side and that is independent of the base station. This is not limited. For example, the another network element may be a cloud server, a node (for example, a node dedicated to model learning) configured on a network side to implement an AI function, or the like. The node configured to implement the AI function may be referred to as an AI node, a wireless intelligent controller, or another name. This is not limited. After generating the candidate reference signal, the another network element may notify the base station of the candidate reference signal through an interface between the network element and the base station or through forwarding by another network element. The base station may allocate the candidate reference signal to the UE for data transmission between the base station and the UE.

The method provided in embodiments of this application may be for preconfigured grant transmission, and is mainly for transmission on a same time-frequency resource, so that more UEs can be supported to perform mission simultaneously on the same time-frequency resource, and signals of different UEs can be well distinguished. For a same UE, when a plurality of time-frequency resources are allocated to the UE, reference signals used by the UE during transmission on the plurality of time-frequency resources may be the same or may be different. This is not limited. Without limitation, the reference signal obtained through the method may alternatively be for another type of transmission, for example, for downlink transmission or dynamic scheduling-based uplink transmission.

When being for uplink transmission, the reference signal generated in embodiments of this application is mainly for performing activity detection on the UE, demodulating an uplink data channel, and/or demodulating an uplink control channel. The uplink data channel or the uplink control channel may be specific to a single UE, or may be shared by a plurality of UEs. This is not limited. The following is described by using an example in which the uplink data channel is a PUSCH and the uplink control channel is a physical uplink control channel (PUCCH). The reference signal may be a DMRS of a PUSCH, a DMRS of a PUCCH, a preamble, or a sounding reference signal (SRS). This is not limited. The DMRS, the preamble, or the SRS of the PUSCH may be for performing UE activity detection, performing uplink measurement, and/or demodulating the PUSCH. The DMRS, the preamble, or the SRS of the PUCCH may be for performing UE activity detection, performing uplink measurement, and/or demodulating the PUCCH.

When being for downlink transmission, the reference signal generated in embodiments of this application is mainly for demodulating a downlink data channel, demodulating a downlink control channel, and/or performing downlink measurement. The downlink data channel or the downlink control channel may be specific to a single UE, or may be shared by a plurality of UEs. This is not limited. The reference signal may be a DMRS of a downlink data channel or a downlink control channel, a channel-state information reference signal (CSI-RS), a synchronization signal, or a positioning reference signal. This is not limited.

For ease of description, the following embodiments are described by using an example in which a generated reference signal is for preconfigured grant transmission.

It is a complex high-dimension problem to design a method for generating a reference signal, to enable the generated reference signal to meet a quantity requirement and a performance requirement. The AI technology can effectively resolve complex high-dimension problems. Machine learning is an important branch of the field of artificial intelligence and a technical means for implementing artificial intelligence. In machine learning, a machine may train or learn training data (which may also be referred to as a training sample), to obtain an AI model. An AI model represents a mapping relationship between a model input and a model output. The AI model may predict a test sample to obtain a prediction result. In embodiments of this application, the AI model may be briefly referred to as a model, a machine learning (ML) model, an AI/ML model, an AI network, or another name. Performing prediction by using a model may also be referred to as performing inference by using a model. The test sample may also be referred to as an inference sample or the like.

As stated above, an AI function includes a model learning function and an inference function. In related embodiments of this application, one node (for example, a base station or an AI node) may implement a model learning function and an inference function, or two different nodes may respectively implement a model learning function and an inference function. This is not limited. For example, the AI node includes a model learning node and an inference node. The model learning node is configured to implement a model learning function, and the inference node is configured to implement an inference function. For another example, the AI node implements a model learning function, and the base station implements an inference function.

A neural network (NN) is a specific implementation form of machine learning. According to the general approximation theorem, the neural network can approximate any continuous function in theory, so that the neural network has the capability of learning any mapping. Therefore, the neural network can accurately perform abstract modeling for a complex high-dimension problem.

Figure 2:
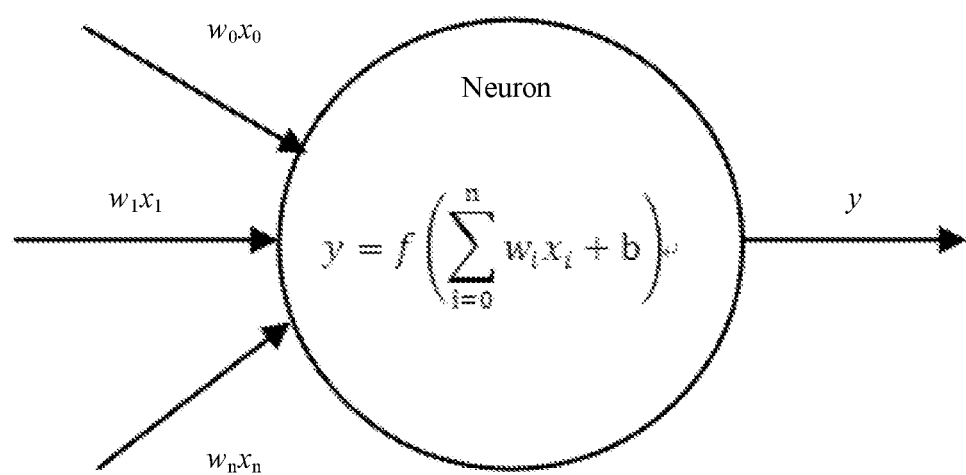
FIG. 2 is a schematic diagram of a neuron structure according to an embodiment of this application.

The idea of the neural network comes from the neuron structure of brain tissue. Each neuron performs a weighted summation operation on input values of the neuron, and outputs a result of the weighted summation through an activation function. FIG. 2 is a schematic diagram of a neuron structure. It is assumed that an input of a neuron is $x=[x_0, x_1, \ldots, x_n]$, a weight corresponding to each input is $w=[w, w_1, \ldots, w_n]$, and an offset of a weighted summation is b. An activation function may have diversified forms. Assuming that an activation function of a neuron is $y=f(z)=\max(0, z)$, an output of the neuron is $y=f(\Sigma_{i=0}^{i=n}w_i*x_i+b)=\max(0, \Sigma_{i=0}^{i=n}w_i*x_i+b)$. For another example, if an activation function of a neuron is $y=f(z)=z$, an output of the neuron is $y=f(\Sigma_{i=0}^{i=n}w_i*x_i+b)=\Sigma_{i=0}^{i=n} w_i*x_i+b$. b may be any possible value such as a decimal, an integer (0, a positive integer, or a negative integer), or a complex number. This is not limited. Activation functions of different neurons in a neural network may be the same or different.

Figure 3:
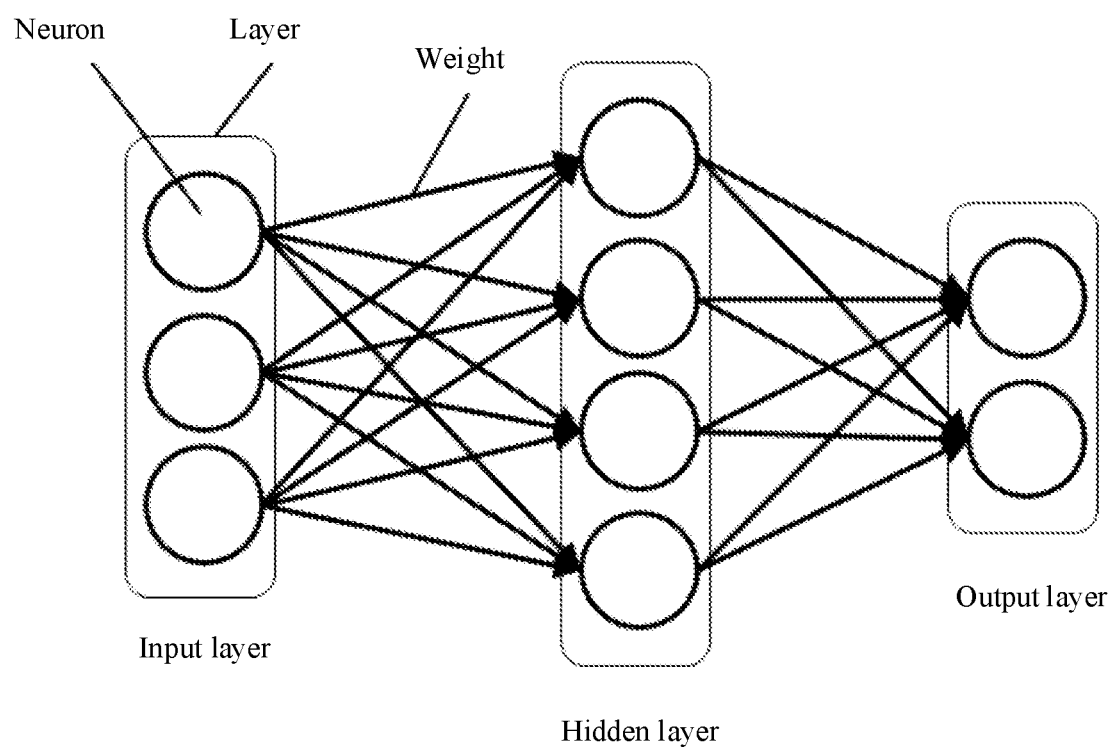
FIG. 3 is a schematic diagram of a layer relationship of a neural network according to an embodiment of this application.

The neural network generally includes a multi-layer structure, and each layer may include one or more neurons. Increasing a depth and/or a width of the neural network can improve an expression capability of the neural network, and provide more powerful information extraction and abstract modeling capabilities for complex systems. The depth of the neural network may refer to a quantity of layers included in the neural network, and a quantity of neurons included in each layer may be referred to as a width of the layer. FIG. 3 is a schematic diagram of a layer relationship of a neural network. In an implementation, the neural network includes an input layer and an output layer. After performing neuron processing on a received input, the input layer of the neural network transfers a result to the output layer, and the output layer obtains an output result of the neural network. In another implementation, the neural network includes an input layer, a hidden layer, and an output layer. After performing neuron processing on a received input, the input layer of the neural network transfers a result to the hidden layer. The hidden layer then transfers a calculation result to the output layer or an adjacent hidden layer. Finally, the output layer obtains an output result of the neural network. A neural network may include one hidden layer or a plurality of hidden layers that are sequentially connected. This is not limited. In a training process of the neural network, a loss function may be defined. The loss function describes a gap or difference between an output value of the neural network and an ideal target value f the neural network. A specific form of the loss function is not limited in this application. The training process of the neural network is a process of adjusting neural network parameters such as a quantity of layers and a width of the neural network, a weight of a neuron, and/or a parameter in an activation function of a neuron, so that a value of a loss function is less than a threshold or meets a target requirement. A specific learning algorithm of the neural network is not limited in this application.

The following describes technical solutions in embodiments of this application in detail with reference to the accompanying drawings. In the solution, a reference signal pool is obtained by training a first neural network, and a base station configures, in the reference signal pool, a reference signal for UE. As described above, in related embodiments of this application, a training process of the first neural network may be implemented by the base station, or may be implemented by another network element A independent of the base station. The network element A may be a node dedicated to an AI function, a node dedicated to a model learning function, a cloud server, or the like on a network side. This is not limited. A reference signal pool obtained by the network element A through learning may be agreed on in a protocol after offline learning, or may be sent to the base station through an interface between the network element A and the base station, or may be forwarded to the base station through another network element B. This is not limited. The network element A may also be referred to as an AI node, an intelligent node, a model training node, or another name. This is not limited.

For ease of description, the following is described through an example in which the base station trains the first neural network. In the method, a training function of the first neural network may be replaced with the foregoing another network element A independent of the base station. Training data that needs to be used by the network element A when the network element A trains the first neural network may be sent by the base station to the network element A through an interface between the network element A and the base station, or forwarded by the base station to the network element A through another network element B, or sent to the network element A after being collected by another network element C. This is not limited. For example, the training data is collected by UE and sent to the base station, and then sent by the base station to the network element A. Alternatively, the training data is collected by a core network from one or more base stations, and then sent by the core network to the network element A.

Figure 4:
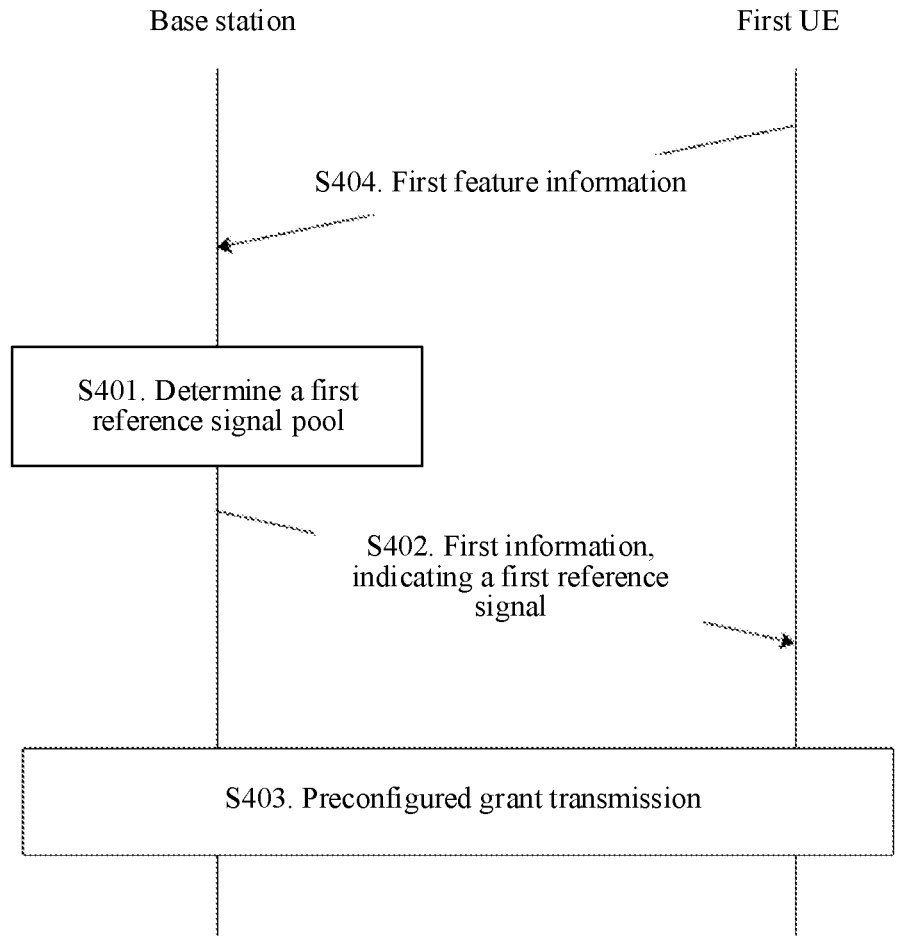
FIG. 4 is a schematic flowchart of a method for configuring a reference signal according to an embodiment of this application.

FIG. 4 is a flowchart of a method for determining a reference signal according to an embodiment of this application. Optionally, when the method includes configuring, by a base station, a reference signal for UE, the method may also be referred to as a method for configuring a reference signal.

S401. A base station determines a first reference signal pool, where the first reference signal pool includes one or more reference signals.

In related embodiments of this application, the reference signal pool represents one or more reference signals. The reference signal pool may also be referred to as a name such as at least one reference signal, at least one candidate reference signal, a reference signal set, or a candidate reference signal set. This is not limited.

The first reference signal pool may be obtained by training a first neural network. In related embodiments of this application, a process of training a neural network may also be referred to as (a) neural network training (process).

In this embodiment of this application, the first neural network represents a neural network, and a reference signal pool may be output by training the neural network. For example, a loss function is set for the neural network. When a value of the loss function meets a requirement, for example, is less than a first threshold, it is considered that a training process of the first neural network ends, so that a trained reference signal pool can be obtained.

S402. The base station sends first information to a first UE, where the first information indicates a first reference signal allocated to the first UE, and the first reference signal is included in the first reference signal pool.

Optionally, in S403, the first UE sends uplink preconfigured grant transmission to the base station on a first resource. The uplink preconfigured grant transmission includes a first PUSCH and the first reference signal. Correspondingly, the base station receives a first PUSCH and a first reference signal from the first UE on the first resource.

The first resource may be a time-frequency resource. If the base station detects or receives the first reference signal on the first resource, the base station considers that transmission of the first UE is detected, that is, it is detected that the first UE is active in a first time unit corresponding to the first resource. Because the base station knows the first reference signal sent by the UE, the base station may perform channel estimation based on the first reference signal sent by the first UE and the first reference signal received by the base station, and receive (for example, demodulate) the first PUSCH by using the channel estimation result.

In this embodiment of this application, preconfigured grant transmission includes, but is not limited to, type 1 configured grant transmission or configured grant type 1 transmission (type 1 configured grant or configured grant type 1) and type 2 configured grant transmission or configured grant type 2 transmission (type 2 configured grant or configured grant type 2).

In the type 1 configured grant transmission or configured grant type 1 transmission, the base station indicates a preconfigured grant to the UE by using radio resource control (radio resource control, RRC) signaling, that is, indicates a transmission parameter of preconfigured grant transmission. When the UE intends to send uplink data, the UE may directly send a PUSCH to the base station by using the transmission parameter indicated by the base station.

In this embodiment of this application, the transmission parameter of the preconfigured grant transmission includes, but is not limited to, at least one of the following parameters of the PUSCH: a time domain resource, a frequency domain resource, a quantity of repetitions, frequency hopping information, a transport block size (TBS), a modulation and coding scheme (MCS), a hybrid automatic repeat request (HARQ) identifier (ID), information about a reference signal pool, information about a reference signal (for example, a sequence value or a sequence index of the reference signal), and a redundancy version (RV).

In the type 2 configured grant transmission or configured grant type 2 transmission, a two-step resource configuration mode is used. In a first step, the base station indicates a preconfigured grant to the UE by using RRC signaling, that is, indicates transmission parameters of preconfigured grant transmission. In a second step, the base station activates preconfigured grant transmission of the UE by using downlink control information (downlink control information, DCI) signaling. Optionally, the DCI may further indicate other transmission parameters of the preconfigured grant transmission. The other transmission parameters may be different from the transmission parameters configured in the first step, or cover some or all of the transmission parameters configured in the first step. After receiving the DCI, the UE considers that the preconfigured grant transmission is activated. Then, when the UE intends to send uplink data, the UE can send the uplink data channel to the base station based on the transmission parameters indicated in the first step and/or the second step.

Optionally, S403 may be replaced with: The first UE sends dynamically scheduled uplink transmission to the base station on a first resource. For example, the uplink transmission may be uplink transmission scheduled by using the first information or other information, and the uplink transmission includes a first PUSCH and the first reference signal. Correspondingly, the base station receives a first PUSCH and a first reference signal from the first UE on the first resource.

Similarly, the first resource may be a time-frequency resource. Because the base station knows the first reference signal sent by the UE, the base station may perform channel estimation based on the first reference signal sent by the first UE and the first reference signal received by the base station, and receive (for example, demodulate) the first PUSCH by using the channel estimation result.

Optionally, S403 may be replaced with: The base station sends downlink transmission to the first UE on a first resource. The downlink transmission may be dynamically scheduled downlink transmission or semi-persistent scheduling (semi-persistent scheduling, SPS)-based downlink transmission. For example, the downlink transmission may be downlink transmission scheduled by using the first information or other information. The downlink transmission includes a first physical downlink shared channel (, PDSCH) and the first reference signal. Correspondingly, the first UE receives the first PDSCH and the first reference signal from the base station on the first resource.

Similarly, the first resource may be a time-frequency resource. Because the first UE knows the first reference signal sent by the base station, the first UE may perform channel estimation based on the first reference signal sent by the base station and the first reference signal received by the first UE, and receive (for example, demodulate) the first PDSCH by using the channel estimation result.

In the method provided in FIG. 4, the first reference signal pool is obtained by training the neural network. Because the neural network can accurately perform abstract modeling for a complex high-dimensional problem, a reference signal pool meeting a quantity requirement and a performance requirement can be obtained through the method.

The following describes in detail how to obtain the first reference signal pool by training the first neural network.

Mode A1: The base station determines the first reference signal pool from M1 reference signal pools based on first feature information of N1 UEs, where the first UE is included in the N1 UEs, and the M1 reference signal pools are obtained by training the first neural network. N1 and M1 are integers greater than or equal to 1. For example, N1 is an integer greater than or equal to 2.

In the method, there are M1 reference signal pools in total, and different reference signal pools correspond to different parameters. When configuring reference signals for the N1 UEs, the base station selects, from the M1 reference signal pools based on the first feature information of the N1 UEs, the first reference signal pool that matches the first feature information of the N1 UEs as much as possible. For example, the N1 UEs are a plurality of UEs that share a same resource in preconfigured grant transmission. Through the method, when a plurality of UEs in the N1 UEs simultaneously transmit preconfigured grant PUSCHs, the base station can better distinguish between different UEs, thereby improving performance of demodulating the PUSCHs of the UEs by the base station. For example, the N1 UEs are a plurality of UEs that are expected to be simultaneously scheduled by the base station on a same resource. Through the method, when a plurality of UEs in the N1 UEs transmit PUSCHs on a same time-frequency resource, the base station can better distinguish between different UEs, thereby improving performance of demodulating the PUSCHs of the UEs by the base station. Alternatively, when a plurality of UEs in the N1 UEs receive PDSCHs on a same time-frequency resource, the UEs can better distinguish or identify signals sent by the base station to them, thereby improving performance of demodulating the PDSCHs by the UEs.

Optionally, the method may further include: The base station configures pre-grants for the N1 UEs respectively. The base station configures a first resource for all the N1 UEs. Optionally, the method may further include: The base station schedules the N1 UEs. The base station allocates a first resource to all the N1 UEs. The first resource may be a time-frequency resource.

The following describes in detail a method for determining the M1 reference signal pools and a method for allocating reference signals in Mode A1.

Method for determining the M1 reference signal pools:

The base station may obtain all reference signal pools in the M1 reference signal pools through training using the following method:

One of the reference signal pools is denoted as a reference signal pool A. The base station trains the first neural network based on a training parameter A and a training sample set A, to obtain the reference signal pool A. The training parameter A includes one or more of the following parameters of the reference signal pool A: a quantity of reference signals, a sequence length of the reference signal, a sequence value range of the reference signal, grouping information of the reference signal, an application scope (for example, including a channel type and a signal-to-noise ratio range) of the reference signal, and a performance requirement of the reference signal. The training sample set A includes P1 training samples, each training sample includes N2 sample points, and each sample point includes a group of second feature information. P1 is an integer greater than or equal to 1, and N2 is an integer greater than or equal to 1. All training samples in the P1 training samples include a same quantity of sample points. The group of second feature information includes one or more of the following parameters: channel information and a data transmission state. Optionally, one sample point may be considered as information about one UE. One training sample may be considered as information about N2 UEs in one time unit. The P1 training samples may be considered as information about the N2 UEs in P1 time units. In practice, the P1 training samples may be information about real N2 UEs, or information about virtually synthesized N2 UEs. This is not limited.

In this embodiment of this application, one time unit includes one or more units of time. The unit of time may be a common communication time domain unit such as a subframe, a slot, a mini-slot, or a symbol, or the unit of time is an absolute unit of time such as 10 ms, 1 ms, or 0.5 ms.

Through the foregoing method, it may be considered that a reference signal pool A corresponding to an input parameter {training parameter A, training sample set A} is obtained. The training parameter A is an example of a training parameter, the training sample set A is an example of a training sample set, and {training parameter, training sample set} is an input parameter of the first neural network.

For M1 different input parameters, the base station may obtain the foregoing M1 reference signal pools by training the first neural network. Training parameters and/or training sample sets of different input parameters are different. Quantities P1 of samples included in training sample sets of different input parameters may be the same or may be different. Quantities N2 of UEs corresponding to individual training samples of different input parameters may be the same or may be different. This is not limited.

Figure 5:
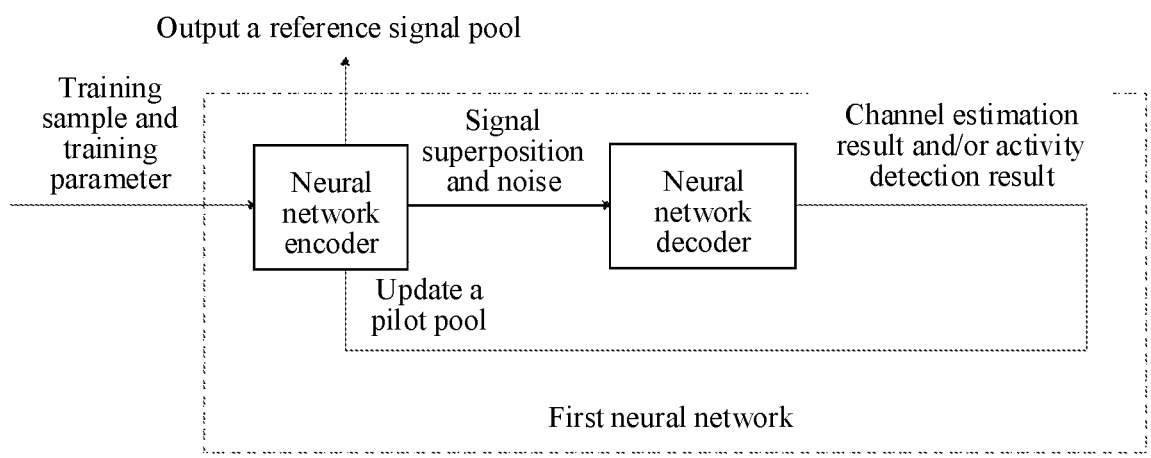
FIG. 5 is an example diagram of obtaining a reference signal pool by training a first neural network according to an embodiment of this application.

FIG. 5 is an example diagram of obtaining a reference signal pool A by training a first neural network. This embodiment of this application is not limited to this training method.

As shown in FIG. 5, the first neural network includes a neural network encoder and a neural network decoder. The neural network encoder is configured to encode a training sample and output a reference signal pool, and the neural network decoder is configured to decode a training sample.

A loss function of the first neural network is for describing a difference between an output of the neural network decoder and an input of the neural network encoder.

Using the foregoing reference signal pool A, the training parameter A, and the training sample set A as an example, the reference signal pool A may be obtained through one training process. The one training process includes one or more times of iterative training. For example, the training process may include the following operations 51 to 55. Operations 52 to 55 may be considered as one time of iterative training in the training process.

Operation 51: Determine an initial reference signal pool A based on a training parameter A.

The training parameter A indicates a feature of reference signals in the reference signal pool A. The reference signal pool A may be obtained based on the feature. For example, the initial reference signal pool A may be randomly generated, or a sequence that meets a requirement may be selected from a sequence pool as reference signals in the reference signal pool A. A specific method is not limited in this application.

Optionally, the training parameter A specifies a quantity of reference signals in the reference signal pool A. For example, the quantity of reference signals in the reference signal pool A may be equal to or less than N2. Alternatively, it is agreed on in a protocol or it is configured in advance that a quantity of reference signals in the reference signal pool A is equal to N2, that is, is equal to a quantity of UEs corresponding to the training sample set A.

Optionally, the training parameter A specifies a sequence length of a reference signal in the reference signal pool A. Alternatively, a sequence length of a reference signal in the reference signal pool A is agreed on in a protocol or configured in advance. The sequence length of the reference signal indicates a quantity of elements included in the reference signal. A reference signal sequence may include one or more elements. A value of each element may be a decimal, an integer, a complex number, or the like. Value types of different elements may be the same or different. This is not limited.

Optionally, the training parameter A specifies a sequence value range of reference signals in the reference signal pool A. Alternatively, a sequence value range of reference signal in the reference signal pool A is agreed on in a protocol or configured in advance. The sequence value range of the reference signals may also be referred to as a sequence space of the reference signals.

For example, specifying (or configuring) the sequence value range of the reference signals includes: specifying that a value of an element in the sequence meets a constant modulus. For example, the modulus value is a positive integer or a decimal, for example, 1, 2, or another value. For another example, specifying (or configuring) the sequence value range of the reference signals includes: specifying a value of each element in the sequence as any one of four constellation points in a quadrature phase shift keying (quadrature phase shift keying, QPSK) constellation diagram. Values of different elements may be the same or different. This is not limited. The four constellation points are respectively:

$$\frac{\sqrt{2}}{2} + \frac{j*\sqrt{2}}{2}, \frac{\sqrt{2}}{2} - \frac{j*\sqrt{2}}{2}, -\frac{\sqrt{2}}{2} + \frac{j*\sqrt{2}}{2}, \text{ and}$$

$$-\frac{\sqrt{2}}{2} - \frac{j*\sqrt{2}}{2}.$$

j is an imaginary unit, and a square of j is equal to −1.

Optionally, the training parameter A specifies grouping information of reference signals in the reference signal pool A. Alternatively, grouping information of reference signals in the reference signal pool A is agreed on in a protocol or configured in advance. The grouping information of the reference signals includes a quantity of reference signal groups in the reference signal pool A. Optionally, the grouping information of the reference signals further includes a quantity of reference signals included in each group of reference signals. For example, a cross-correlation value of different reference signals in a group is less than or equal to a first threshold, a cross-correlation value of different intergroup reference signals is less than or equal to a second threshold, and the first threshold is less than the second threshold. A specific application of grouped reference signals is described below in detail.

Optionally, the training parameter A specifies a performance requirement of reference signals in the reference signal pool A. Alternatively, a performance requirement of reference signals in the reference signal pool A is agreed on in a protocol or configured in advance. The performance requirement of the reference signals includes a requirement of a performance loss function of the first neural network, for example, indicates a threshold of the performance loss function. The performance requirement that the reference signals meet includes one or more of the following:

a false alarm probability threshold or a missing detection probability threshold when decoding is performed by using the reference signals, that is, a false alarm probability threshold and a missing detection probability threshold that need to be met when decoding is performed by using the neural network decoder of the first neural network;

a mean square error (mean square error, MSE) threshold when channel estimation is performed by using the reference signals, that is, a threshold that needs to be met by a difference between a channel estimated by using the neural network decoder and a channel input to the neural network encoder; or a peak-to-average power ratio (PAPR) threshold of the reference signals in the reference signal pool A. For example, a PAPR of at least one reference signal in the reference signal pool A needs to be lower than the threshold, or PAPRs of all the reference signals in the reference signal pool A need to be lower than the threshold; and if the reference signals and data (for example, a PUSCH or a PDSCH) are sent together during training, the performance requirement may further include a bit error rate, a block error rate, or a cross entropy when data is demodulated by using a channel estimated by using the reference signals.

Operation 52: Input P1 training samples in the training sample set A into the first neural network sequentially. For each training sample in the P1 training samples, the neural network encoder encodes, based on the reference signal pool A, a channel response matrix corresponding to channel information in the training sample, to obtain respective first output signals of N2 UEs corresponding to the training sample. In this embodiment of this application, the channel response matrix may also be referred to as a channel or a channel matrix for short. This is not limited.

For example, each training sample includes channel information and a data transmission state of each UE in the N2 UEs.

For example, each training sample includes the channel information of each UE in the N2 UEs. In this case, it may be considered that the data transmission state of each UE is Active. In this case, the channel information of each UE may be uplink channel information or downlink channel information.

For example, each training sample includes the data transmission state of each UE in the N2 UEs. In this case, the channel of each UE may be agreed on in a standard, and the first neural network may obtain the channel based on the agreement. For example, a channel type and a channel parameter may be agreed on in the standard. The channel agreed on in the standard includes, but is not limited to, an additive white Gaussian noise (additive white Gaussian noise, AWGN) channel, a Rayleigh channel, a Rice channel, a TDL (tapped delay line) channel, a CDL (clustered delay line) channel, an EPA (extended pedestrian A model) channel, an EVA (extended vehicular A) channel, an ETU (extended typical urban) channel, or the like. Channel types and/or channel parameters of different UEs may be the same or different.

A data transmission state of UE may be referred to as an active state, and a value of the active state is Active or Inactive. Active indicates that data of the UE is considered to be transmitted in the sample, and Inactive indicates that data of the UE is considered to be not transmitted in the sample. The channel information of the UE is for determining a channel response matrix of the UE. Channels of different UEs may be the same or different. This is not limited. The channel response matrix may also be referred to as a channel matrix or a channel response.

In the foregoing method, the training process of the first neural network is performed by the base station, and the base station inputs the channel information into the first neural network. The channel information may be agreed on in a standard, obtained by the base station through uplink measurement, or obtained by the base station through a second neural network.

For example, a channel type and a channel parameter are agreed on in a standard. The base station may obtain a plurality of channel sample points by inputting different channel parameters for one or more types of channels. The base station may organize the plurality of channel sample points into a training sample set. The base station may set a data transmission state for a training sample in the training sample set.

For example, the channel information is obtained based on uplink reference signals that are of N3 UEs historically accessing the base station and that are measured by the base station. N3 is an integer greater than or equal to 1. The base station may set the data transmission state for the training sample in the training sample set, or the base station uses a real state of the measurement result as the data transmission state of the training sample. This is not limited. The N3 UEs may be the same as or different from the N1 UEs. This is not limited. Optionally, the method is for training an uplink reference signal.

For example, the channel information is obtained, based on a downlink reference signal, through measurement by the N3 UEs historically accessing the base station, and is reported to the base station. N3 is an integer greater than or equal to 1. The N3 UEs may be the same as or different from the N1 UEs. This is not limited. Optionally, the method is for training a downlink reference signal.

For example, the channel information is obtained based on the second neural network.

In an embodiment, the second neural network represents a channel response. The second neural network may be used to predict (or infer) a received signal after a sent signal passes through a channel. For example, an input of the second neural network may be considered as an uplink signal sent by the UE to the base station, and an output of the second neural network may be considered as a simulated uplink signal received by the base station from the UE. For another example, an input of the second neural network may be considered as a downlink signal sent by the base station to the UE, and an output of the second neural network may be considered as a simulated downlink signal received by the UE from the base station. A specific form of the second neural network is not limited in this embodiment of this application. For example, a signal whose signal value is 1 is input into the second neural network, and an output of the second neural network may be considered as the foregoing channel response h. In this case, the output of the second neural network may be used as the channel information in the foregoing training sample.

In another embodiment, the second neural network may generate a channel response based on an input random number. Channel responses of a plurality of channel samples meet a specific random distribution. A parameter of the random distribution may be obtained by training the second neural network. After the parameter of the second neural network is determined, a channel response that meets the random distribution may be generated by inputting a random number that meets a predetermined distribution, and the channel response is for training of the first neural network.

The second neural network may be independently trained by the base station, may be jointly trained by the base station and the UE, or may be sent by another node (for example, an AI node) on a network side to the base station. This is not limited. For example, in a training process of the second neural network, the base station receives an uplink reference signal from the UE, and the network side may adjust the parameter of the second neural network based on the received uplink reference signal. In this way, when the input of the second neural network is the uplink reference signal sent by the UE, the output is close to the uplink reference signal actually received by the base station from the UE as much as possible, to enable, for example, a difference, such as a difference value, a correlation coefficient, a mean square error, and/or a covariance value, between the output of the second neural network and the uplink reference signal actually received by the base station meets a requirement of a performance loss function. As described above, the channel information may be a channel response. The channel response may be represented as a channel matrix h, where an element in h is a complex number. Alternatively, the channel information is information that can be used for determining the channel matrix h, for example, a channel type and a channel parameter. This is not limited.

In an embodiment, the reference signal pool A includes N2 reference signals. For a case in which a training sample in the P1 training samples is input into the first neural network, an input layer of the neural network encoder includes N2*L neurons, where L is a length of a pilot sequence or a channel length, and L is an integer. Every L neurons correspond to an equivalent channel $\tilde{h}_i$ of one UE in the N2 UEs. In the equivalent channel $\tilde{h}_i = a_i * h_i$, $a_i$ indicates a data transmission state of the $i^{th}$ UE in the training sample, and a value of i ranges from 1 to N2. When a data transmission state of UE is Active, a in an activation function of a neuron corresponding to the UE is 1. When the data transmission state of the UE is Inactive, a in the activation function of the neuron corresponding to the UE is 0, and $h_i$ indicates a channel matrix of the $i^{th}$ UE in the training sample. When the training sample includes only channel information of UEs, and does not include data transmission states of the UEs, that is, the data transmission states of the UEs are all Active, the equivalent channel $\tilde{h}_i = h_i$. The neural network encoder includes an output layer. An output of the output layer is denoted as y. The output layer includes L neurons, representing a superimposed signal obtained after N2 reference signals pass through channels. An activation function of the $j^{th}$ neuron is $y_j = \Sigma_{i=1}^{i=N2} \tilde{h}_{i,j} * s_{i,j}$, where $s_{i,j}$ represents a weight of the $j^{th}$ neuron. The weight corresponds to the $j^{th}$ element of the $i^{th}$ reference signal in the N2 reference signals, and a value of j ranges from 1 to L. The process is for simulating superimposed transmission of the channels of the N2 UEs in channels. Alternatively, the superposition function may be implemented through the following step 53.

For the P1 training samples, a total of P1 y may be obtained. Step 53 or step 54 may be separately performed for a first output signal corresponding to each training sample.

Optionally, in operation 53, signal superposition is performed on N2 first output signals obtained in operation 52 to obtain a second output signal; or signal superposition and noise addition are performed on N2 first output signals obtained in operation 52 to obtain a second output signal. Optionally, the signal superposition in operation 53 may be implemented by the neural network encoder, or may be implemented by another module different from the neural network encoder. This is not limited.

For the P1 training samples, a total of P1 second output signals may be obtained. Step 54 may be separately performed for the second output signal corresponding to each training sample.

Operation 54: Input the second output signal to the neural network decoder, where the neural network decoder decodes the second output signal to obtain a decoded output signal. The decoding operation in operation 54 may be considered as an inverse operation of encoding in operation 52, and is for restoring the channel information in the training sample in operation 52.

In an embodiment, the neural network decoder is implemented by using a fully connected multi-layer neural network, and weights between the input layer, the hidden layer, and the output layer are determined based on the training sample and a training algorithm. For example, the input layer of the neural network decoder includes X1 neurons, X1 corresponds to a dimension of the second output signal, and the output layer includes N2 neurons, corresponding to a dimension of the decoded output signal.

In another embodiment, the neural network decoder is implemented by using a model-driven multi-layer neural network. For example, the neural network decoder is implemented based on an approximate message passing algorithm, where the neural network decoder includes Q layers, and the $q^{th}$ layer may be represented by a formula:

$$X^{q+1} = \eta(X^q + A^H * R^q)$$

$$R^{q+1} = Y - A * X^{q+1} + \delta^q * R^q * \langle \eta'(x_n{}^q + A^H * R^q) \rangle, \text{ where}$$

a value of q ranges from 1 to Q, Y represents the second output signal, A represents a matrix formed by sequences in the reference signal pool, $X^q$ represents a $q^{th}$-layer estimated decoded output signal, $R^q$ represents a $q^{th}$-layer estimated residual signal, $\delta^q$ is a to-be-trained parameter or a predetermined constant, $\eta(\cdot)$ represents a to-be-trained nonlinear function or a predetermined nonlinear function, $\eta'(\cdot)$ represents a derivative of $\eta(\cdot)$, $\langle \cdot \rangle$ represents an average value of a vector, and $A^H$ represents a conjugate transposition of A. An output of the neural network decoder is X at the last layer, and each row (or column) of X represents a channel response that is of each UE in each N2 UEs and that is attempted to be restored.

The neural network decoder in operation 54 attempts to restore $h_i$. Optionally, the signal restored in step 54 is denoted as $h'_i$.

For one training sample, N2 $h'_i$ may be restored in total. For the P1 training samples, P1 groups of N2 $h'_i$ may be restored in total.

Operation 55: Determine performance of the first neural network based on the channel information input in operation 52 and/or the channel matrix restored in operation 54. If the performance meets the performance requirement of the reference signals in the reference signal pool A described in operation 51, the current reference signal pool A is used as a reference signal pool A output by the first neural network, and the training process of the first neural network is stopped; or otherwise, an updated reference signal pool A is obtained based on the training parameter A, or based on the reference signal pool A and the training parameter A, that is, the reference signal pool A is updated, and operation 52 is performed again.

This embodiment of this application does not limit an internal algorithm of the first neural network, for example, does not limit a method for updating a reference signal by the first neural network.

Optionally, performance of the first neural network includes a false alarm probability threshold when decoding is performed by using a reference signal in the reference signal pool A. For each $h'_i$, if an absolute value of $h'_i$ is greater than a threshold, it is considered, according to a decoding result, that a corresponding user state is Active; or otherwise, it is considered that a corresponding user state is Inactive. In this case, if a data transmission state corresponding to $h_i$ is Inactive, but the decoding result is Active, a quantity of false alarms is increased by 1. An initial value of the quantity of false alarms is 0. For N2*P1 $h'_i$, a false alarm probability is: Total quantity of false alarms/(N2*P1), where/represents division. If the false alarm probability is less than the foregoing false alarm probability threshold, it is considered that the performance of the first neural network already meets the performance requirement of the reference signals in the reference signal pool A described in operation 51.

Optionally, performance of the first neural network includes a missing detection probability threshold when decoding is performed by using a reference signal in the reference signal pool A. For each $h'_i$, if an absolute value of $h'_i$ is greater than a threshold, it is considered, according to a decoding result, that a corresponding user state is Active; or otherwise, it is considered that a corresponding user state is Inactive. In this case, if a data transmission state corresponding to $h_i$ is Active, but the decoding result is Inactive, a quantity of missing detections is increased by 1. An initial value of the quantity of missing detections is 0. For N2*P1 $h'_i$, a missing detection probability is: Total quantity of missing detections/(N2*P1), where/represents division. If the missing detection probability is less than the foregoing missing detection probability threshold, it is considered that the performance of the first neural network already meets the performance requirement of the reference signals in the reference signal pool A described in operation 51.

For example, the performance of the first neural network includes an MSE threshold when decoding is performed by using a reference signal in the reference signal pool A. A channel estimated by the neural network decoder is $h'_i$, and a channel input by the neural network encoder is $h_i$. When an MSE between $h'_i$ and $h_i$ is less than the threshold, it is considered that the performance of the first neural network already meets the performance requirement of the reference signals in the reference signal pool A described in operation 51.

For example, the performance of the first neural network includes a PAPR threshold of the reference signals in the reference signal pool A. When a PAPR of a time domain signal corresponding to a reference signal sequence is less than the threshold, it is considered that the performance of the first neural network already meets the performance requirement of the reference signals in the reference signal pool A described in operation 51. The time domain signal corresponding to the reference signal sequence may be obtained by performing inverse Fourier transform on the reference signal sequence.

Method for Allocating Reference Signals

In Mode A1, the base station may determine the first reference signal pool from the M1 reference signal pools based on the first feature information of the N1 UEs, and allocate the first reference signal in the first reference signal pool to the first UE.

The first feature information of the N1 UEs includes one or more of the following information of each UE in the N1 UEs: service feature information, data transmission state information, channel information, and location information.

Optionally, the method in FIG. 4 includes S404: Each UE in the N1 UEs sends first feature information of the UE to the base station. Alternatively, the method in FIG. 4 includes: The base station measures or determines first feature information of the N1 UEs.

In a method embodiment, the base station collects statistics about service feature information and data transmission state information of the N1 UEs from collected historical data. For example, the base station collects statistics about a periodicity at which each UE sends data, data of which UEs in the N1 UEs that can be detected in each time unit, a change rule of a service of each UE with time, and the like.

In another method embodiment, each UE in the N1 UEs sends an uplink reference signal or data, for example, a DMRS, an SRS, or a PUSCH, to the base station, and the base station measures channel information or location information of each UE by receiving the uplink reference signal or the data sent by the UE.

In another method embodiment, the base station sends a downlink reference signal or data such as a DMRS, a CSI-RS, or a PDSCH to each UE in the N1 UEs, and each UE measures channel information or location information based on the received downlink reference signal or data, and reports the information obtained through measurement to the base station. For example, if a coverage region of the cell in which the UE is located is divided into a plurality of regions in advance, the UE may report, to the base station, a block in which the UE is located.

In this embodiment of this application, the service feature information includes a service type. For example, the service type includes a full buffer (full buffer) service that always has service transmission, a burst (burst) service, a periodic service, or the like. This is not limited.

Example 1: The first feature information of the N1 UEs includes a plurality of groups of feature information A, and each group of feature information A includes one piece of channel information and/or one piece of data transmission state information of each UE. The one piece of channel information may be a channel response in a time unit, and the one piece of data transmission state information indicates that data transmission of the UE in the time unit is Active or Inactive. The plurality of groups of feature information A may be considered as information about the N1 UEs in a plurality of time units. The base station may select the first reference signal pool from the M1 reference signal pools. Information about the N2 UEs in the training sample set of the first reference signal pool is more matched or consistent with information about the N1 UEs in Mode A1. For example, information about N1 UEs in the N2 UEs is more matched or consistent with information about N1 UEs in Mode A1.

Example 2: The first feature information of the N1 UEs includes a plurality of groups of feature information A and N1 pieces of service feature information, and each group of feature information A includes one piece of channel information of each UE. The one piece of channel information may be a channel response in one time unit. The N1 pieces of service feature information correspond to the N1 UEs in a one-to-one manner. The base station may determine, based on the service feature information of the UEs, whether the data transmission states of the UEs in a plurality of time units are Active or Inactive. The same as the corresponding method in Example 1, the base station may select the first reference signal pool from the M1 reference signal pools.

Example 3: The first feature information of the N1 UEs includes a plurality of groups of feature information A and N1 channel models, and each group of feature information A includes one piece of data transmission state information of each UE. The one piece of data transmission state information may indicate that a data transmission state of the UE in a time unit is Active or Inactive. The N1 channel models respectively correspond to the N1 UEs in a one-to-one manner. A channel model of each UE may predict a channel response of the UE in a plurality of time units. The same as the corresponding method in Example 1, the base station may select the first reference signal pool from the M1 reference signal pools.

Example 4. The first feature information of the N1 UEs includes N1 pieces of service feature information and N1 channel models. The N1 pieces of service feature information correspond to the N1 UEs in a one-to-one manner. The base station may determine, based on the service feature information of the UEs, whether the data transmission states of the UEs in a plurality of time units are Active or Inactive. The N1 channel models respectively correspond to the N1 UEs in a one-to-one manner. A channel model of each UE may predict a channel response of the UE in a plurality of time units. The same as the corresponding method in Example 1, the base station may select the first reference signal pool from the M1 reference signal pools.

Optionally, the base station may select the first reference signal pool from the M1 reference signal pools based on a quantity N1 of the N1 UEs. For example, a quantity of reference signals included in the first reference signal pool is greater than or equal to N1.

Optionally, the base station may select the first reference signal pool from the M1 reference signal pools based on a length of reference signals of the N1 UEs. For example, a length of reference signals included in the first reference signal pool is greater than or equal to the length of the reference signals of the N1 UEs.

Optionally, the base station may select the first reference signal pool from the M1 reference signal pools based on a size of a first resource to be shared by the N1 UEs. For example, a length of reference signals included in the first reference signal pool is greater than or equal to a length of reference signals transmitted on the first resource.

Optionally, the base station may determine one or more of the following information based on the first feature information of the N1 UEs: a quantity of UEs, a quantity of UE groups, and/or a quantity of UEs in each group of UEs.

For example, the base station uses first feature information of the N1 UEs in a time period based on a machine learning algorithm to classify the N1 UEs based on the machine learning algorithm. For example, a classification result may be that, within the time period, UEs with close data transmission states are grouped into one group; and/or a classification result may be that, within the time period, UEs with close channel information is grouped into one group; and/or a classification result may be that UEs with similar service types are grouped into one group; and/or a classification result may be that UEs with close locations are grouped into one group.

For example, the base station groups UEs that need to share resources into 10 groups, and each group includes 50 UEs. In this case, a reference signal requirement is: A quantity of reference signals is 500, a quantity of reference signal groups is 10, and a pilot length is 72. In this case, the base station may select one reference signal pool. The reference signal pool includes 10 groups of reference signals, a quantity of reference signals in each group of reference signals is greater than or equal to 50, and a length of each reference signal is 72.

Figure 6:
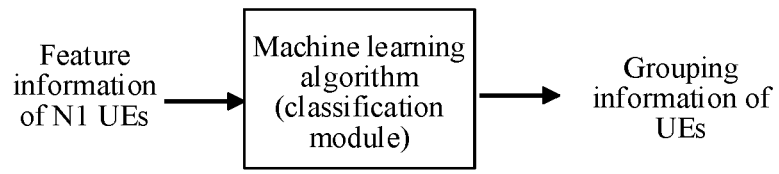
FIG. 6 and FIG. 7 are schematic diagrams of a classification algorithm according to an embodiment of this application.

Optionally, similar to the schematic diagram of the algorithm shown in FIG. 6, the machine learning algorithm may be implemented through a neural network or another machine learning algorithm. This is not limited.

For example, the time period includes 1000 time units, and 1000 samples corresponding to the 1000 time units are determined for each UE in the N1 UEs, where each sample includes channel information and/or a data transmission state of the UE in a corresponding time unit. In this case, the N1 UEs may be classified based on the machine learning algorithm.

Figure 7:
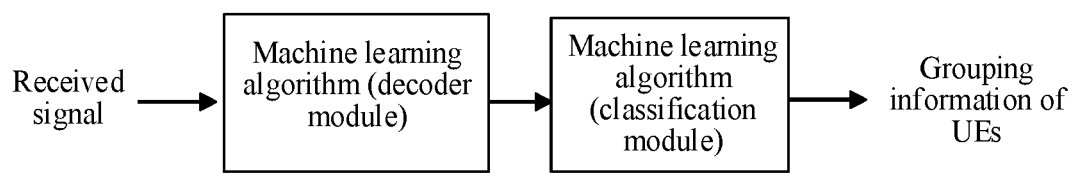

Optionally, similar to the schematic diagram of the algorithm shown in FIG. 7, the machine learning algorithm may further include a decoder module and a classification module. An input of the decoder module is a signal received by the base station from the UE, and output is a data transmission state and channel information of the UE that are obtained through decoding. Similar to the foregoing classification method, the classification module may classify the UEs.

For example, the time period includes 1000 time units, and 1000 samples corresponding to the 1000 time units are determined for each UE in the N1 UEs, where each sample includes received information of the UE in a corresponding time unit. In this case, the N1 UEs may be classified based on the machine learning algorithm including the decoder module.

Optionally, the base station may select the first reference signal pool from the M1 reference signal pools based on a quantity NN1 of UE groups of the N1 UEs. For example, a quantity of reference signal groups included in the first reference signal pool is greater than or equal to the quantity NN1 of UE groups of the N1 UEs.

Optionally, the base station may select the first reference signal pool from the M1 reference signal pools based on a quantity of UEs in each group of UEs in the N1 UEs. For example, the first reference signal pool includes at least NN1 groups of reference signals, the NN1 groups of reference signals may correspond to NN1 groups of UEs in a one-to-one manner, and a quantity of reference signals in each group of reference signals is greater than or equal to a quantity of UEs in a corresponding UE group.

As described above, a correlation value of intra-group reference signals is low. Through the foregoing grouping method, different reference signals with low cross-correlation may be allocated to different UEs with large interference, so that interference between the UEs can be reduced, and uplink receiving performance of the base station can be improved.

A plurality of (for example, two, three, or more) methods for selecting the first reference signal pool in the foregoing methods may be used in combination. For example, the base station may select the first reference signal pool from the M1 reference signal pools based on a quantity N1 of N1 UEs and a length of reference signals of the N1 UEs. For example, a quantity of reference signals included in the first reference signal pool is greater than or equal to N1, and a length of the reference signals included in the first reference signal pool is greater than or equal to a length of reference signals of the N1 UEs.

After determining the first reference signal, the base station may indicate the first reference signal to the first UE through first information. The first information may be a configured grant described above, or another message different from the preconfigured grant.

In this embodiment of this application, signaling sent by the base station to the UE may be radio resource control (RRC) signaling, for example, common RRC signaling or UE-specific RRC signaling, or may be a media access control (MAC) control element (CE), or may be physical layer signaling. This is not limited. The common RRC signaling is signaling for a plurality of UEs, and may be, for example, a master information block (MIB) or a system information block (SIB). The physical layer signaling may be signaling carried on a physical layer control channel (such as a physical downlink control channel (PDCCH)), for example, downlink control information (DCI).

In this embodiment of this application, a message type of the first information may be RRC signaling, a MAC CE, or DCI. This is not limited.

Optionally, the first information includes a sequence value of the first reference signal.

Optionally, the first information includes a compressed value of a sequence value of the first reference signal.

Figure 8:
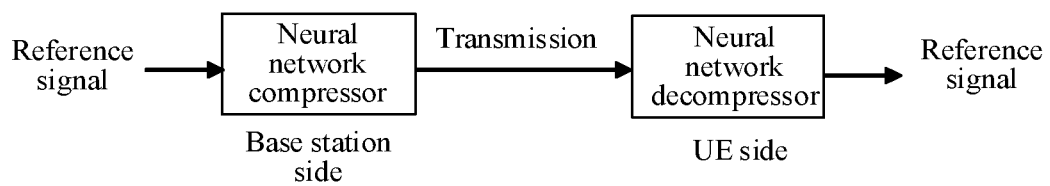
FIG. 8 is a schematic diagram of reference signal transmission according to an embodiment of this application.

In this embodiment of this application, for example, as shown in FIG. 8, the compressed value sent by the base station to the UE may be obtained by the base station through compression performed by a neural network compressor. After receiving the compressed value, the UE restores the sequence value of the first reference signal through a neural network decompressor. The neural network compressor and the neural network decompressor are respectively configured to implement compression and decompression functions, and may be considered as dual neural networks. For example, an input of the neural network compressor is a sequence value of the first reference signal, and an output is a compressed value. An input of the neural network decompressor is a compressed value of a sequence value of the first reference signal, and an output is the sequence value of the first reference signal. The neural network compressor and the neural network decompressor may be obtained through training by an AI node, obtained through training by the base station, obtained through joint training by the base station and the UE, or obtained through joint training by the AI node and the UE. This is not limited. The neural network compressor may further include a quantizer, configured to implement real-to-bit quantization, to facilitate transmission of the compressed value based on the first information.

Optionally, the first information indicates an offset of the first reference signal relative to a reference signal previously configured for the first UE. For example, the first information includes the offset value or a compressed value including the offset value. The reference signal previously configured for the first UE may be referred to as a current reference signal of the first UE. After receiving the first information, the first UE updates the current reference signal of the UE. Optionally, the first information indicates an offset value of the first reference signal relative to a reference reference signal. For example, the first information includes the offset value or a compressed value of the offset value. The reference reference signal may be a reference signal that is configured in advance by the base station for the UE or that is agreed on in a protocol, and the first information may further include an index of the reference reference signal. The reference reference signal may also be referred to as a baseline reference signal, a default reference signal, a third reference signal, or another name. This is not limited.

Optionally, the first information includes an index of the first reference signal. For example, the first reference signal pool includes T4 reference signals, and each reference signal has a unique identifier or index. For example, indexes of the T4 reference signals are respectively 0 to T4-1. Alternatively, the first reference signal pool and another reference signal pool (for example, a second reference signal pool) include a total of T4 reference signals, and each reference signal has a unique identifier or index. For example, indexes of the T4 reference signals are respectively 0 to T4-1.

In the foregoing two methods, information about the reference signals included in the first reference signal pool may be agreed on in a protocol after offline training, or may be configured by the base station for the first UE through another message different from the first information. This is not limited. The information about the reference signals included in the first reference signal pool includes a sequence value and an index of each reference signal. Alternatively, the information about the reference signals included in the first reference signal pool includes a compressed value and an index of a sequence value of each reference signal.

In the foregoing second method, information about the reference signals included in the another reference signal pool (for example, the second reference signal pool) may be agreed on in a protocol, or may be configured in advance by the base station for the first UE by using signaling. For example, a protocol specifies a sequence value and an index of each reference signal included in the reference signal pool.

For example, Table 1 shows information about the reference signals in the first reference signal pool. If the base station indicates, to the first UE through the first information, that an index of the first reference signal is 1, the UE uses [b1, b2, . . . , bn] as a sequence value of the first reference signal.

For example, as shown in Table 1, reference signals whose indexes are 0 to 2 are information about reference signals in the second reference signal pool, and reference signals whose indexes are 3 to 5 are information about the reference signals in the first reference signal pool. If the base station indicates, to the first UE through the first information, that an index of the first reference signal is 1, the UE uses [b1, b2, . . . , bn] as a sequence value of the first reference signal.

TABLE 1

| Index of reference signal | Reference signal |
|---|---|
| 0 | [a1, a2 . . . an] |
| 1 | [b1, b2 . . . bn] |
| 2 | [c1, c2 . . . cn] |
| 3 | [d1, d2 . . . dn] |
| 4 | [e1, e2 . . . en] |
| 5 | [f1, f2 . . . fn] |

Optionally, the first information includes an index of the first reference signal pool and an index of the first reference signal. Each reference signal pool in the M2 reference signal pools has a unique identifier or index. For example, indexes of the M2 reference signal pools are respectively 0 to M2-1. The M2 reference signal pools may be included in the foregoing M1 reference signal pools, and M2 is less than or equal to M1. The first reference signal pool includes T4 reference signals, and each reference signal has a unique identifier or index. For example, indexes of the T4 reference signals are respectively 0 to T4-1. In the method, information about the M2 reference signal pools may be agreed on in a protocol after offline training, or may be configured by the base station for the first UE through another message different from the first information. This is not limited. The information about the M2 reference signal pools includes information about each reference signal pool in the M2 reference signal pools. The information about each reference signal pool includes a sequence value and an index of each reference signal in the reference signal pool. Alternatively, the information about each reference signal pool includes a compressed value of a sequence value and an index of each reference signal in the reference signal pool. The compression value may be obtained by the base station through compression performed by the neural network compressor. After receiving the compressed value, the UE restores the sequence value of the each reference signal through the neural network decompressor.

For example, Table 2 shows index information of three reference signal pools. If the base station indicates, through the first information, that the index of the first reference signal pool is 0, the UE considers a reference signal pool 1 as the first reference signal pool. It is assumed that information about the first reference signal pool is shown in Table 1. If the base station indicates, for the first UE through the first information, that an index of the first reference signal is 3, the UE uses [d1, d2, . . . , dn] as a sequence value of the first reference signal.

TABLE 2

| Index of reference signal pool | Reference signal pool |
|---|---|
| 0 | Reference signal pool 1 |
| 1 | Reference signal pool 2 |
| 2 | Reference signal pool 3 |

Optionally, the first information includes an index of the first reference signal pool. Each reference signal pool in the M2 reference signal pools has a unique identifier or index. For example, indexes of the M2 reference signal pools are respectively 0 to M2-1. The M2 reference signal pools may be included in the foregoing M1 reference signal pools, and M2 is less than or equal to M1. The first reference signal pool includes T4 reference signals, and the UE randomly selects one reference signal from the T4 reference signals. In the method, information about the M2 reference signal pools may be agreed on in a protocol after offline training, or may be configured by the base station for the first UE through another message different from the first information. This is not limited. The information about the M2 reference signal pools includes information about each reference signal pool in the M2 reference signal pools. The information about each reference signal pool includes a sequence value and an index of each reference signal in the reference signal pool. Alternatively, the information about each reference signal pool includes a compressed value of a sequence value and an index of each reference signal in the reference signal pool. The compression value may be obtained by the base station through compression performed by the neural network compressor. After receiving the compressed value, the UE restores the sequence value of the each reference signal through the neural network decompressor.

A message type of the another message different from the first information may be the same as or different from a message type of the first information. This is not limited. For example, the former is a SIB, and the latter is UE-specific RRC signaling. For another example, the former is a SIB, and the latter is DCI. For another example, the former is common RRC signaling, and the latter is UE-specific RRC signaling.

Optionally, in the foregoing method, the index of the first reference signal is an index of the first reference signal in the first reference signal pool. The index may also be replaced with an index of a reference signal group to which the first reference signal belongs and an index of the first reference signal in the group. The information about the reference signal pool further includes a reference signal group to which each reference signal in the reference signal pool belongs.

For example, Table 3 shows information about the first reference signal pool. If the base station indicates, through the first information, that an index of a reference signal group to which the first reference signal in the first reference signal pool belongs is 1 and an index of the first reference signal in the group is 2, the UE uses [f1, f2, . . . , fn] as a sequence value of the first reference signal.

TABLE 3

| Index of reference signal group | Intra-group index of reference signal | Reference signal |
|---|---|---|
| 0 | 0 | [a1, a2 ... an] |
|   | 1 | [b1, b2 ... bn] |
|   | 2 | [c1, c2 ... cn] |
| 1 | 0 | [d1, d2 ... dn] |
|   | 1 | [e1, e2 ... en] |
|   | 2 | [f1, f2 ... fn] |

Optionally, the first information includes an index of the first reference signal pool and an index of a reference signal group to which the first reference signal belongs, and the UE randomly selects one reference signal from the reference signal group to which the first reference signal belongs.

Mode A2: The base station trains the first neural network based on information about the N1 UEs, to obtain the first reference signal pool.

The first reference signal pool is obtained by training the first neural network based on a training parameter and a training sample set. The training parameter includes one or more of the following parameters of the first reference signal pool: a quantity of reference signals, a sequence length of the reference signal, a sequence value range of the reference signal, grouping information of the reference signals, an application scope (for example, including a channel type and a signal-to-noise ratio range) of the reference signal, and a performance requirement of the reference signal. The training sample set includes P2 training samples. Each training sample includes one or more of the following parameters of each of the N1 UEs: channel information and a data transmission state. The first UE is included in the N1 UEs, P2 is an integer greater than or equal to 1, and N1 is an integer greater than or equal to 1.

In the method, the base station trains the first neural network based on the information about the N1 UEs to obtain the first reference signal pool. For example, the N1 UEs are a plurality of UEs that share a same resource in preconfigured grant transmission. Through the method, when a plurality of UEs in the N1 UEs simultaneously transmit preconfigured grant PUSCHs, the base station can better distinguish between different UEs, thereby improving performance of demodulating the PUSCHs of the UEs by the base station. For example, the N1 UEs are a plurality of UEs that are expected to be simultaneously scheduled by the base station on a same resource. Through the method, when a plurality of UEs in the N1 UEs transmit PUSCHs on a same time-frequency resource, the base station can better distinguish between different UEs, thereby improving performance of demodulating the PUSCHs of the UEs by the base station. Alternatively, when a plurality of UEs in the N1 UEs receive PDSCHs on a same time-frequency resource, the UEs can better distinguish or identify signals sent by the base station to them, thereby improving performance of demodulating the PDSCHs by the UEs.

Optionally, the method may further include: The base station preconfigures grants for the N1 UEs respectively. The base station configures a first resource for all the N1 UEs. Optionally, the method may further include: The base station schedules the N1 UEs. The base station allocates a first resource to all the N1 UEs. The first resource may be a time-frequency resource.

A training process of the first reference signal pool in Mode A2 is similar to a training process of a reference signal pool in Mode A1. Therefore, the training process of the first reference signal pool in Mode A2 is not further described.

Mode A2 differs from Mode A1 in that:
(1) In Mode A1, the training sample set A for training the first neural network is obtained by collecting historical data, or is generated virtually. The collected historical data may be data of the foregoing N1 UEs, or may not be data of the N1 UEs. However, in Mode A2, the base station collects data of the N1 UEs for training the first reference signal pool.
(2) In Mode A1, the base station may train a plurality of reference signal pools, and select, from the plurality of reference signal pools, the first reference signal pool matching feature information of the N1 UEs. However, in Mode A2, the base station trains only one first reference signal pool for the N1 UEs based on information about the N1 UEs.

For example, in Mode A2, the training sample set includes P2 training samples. The base station may attempt to receive the uplink signal A from the foregoing N1 UEs in P2 time units, for estimating the P2 training samples. The uplink signal A is agreed on in a protocol, or is configured in advance by the base station for the UE by using signaling. A type of the uplink signal A may be the same as or different from a type of a reference signal in a reference signal pool determined in this embodiment of this application. This is not limited. For example, the former is an SRS, and the latter is a DMRS of a PUSCH. For another example, the former is an access preamble, and the latter is a DMRS of a PUSCH. In the P2 training samples, each training sample corresponds to one time unit in the P2 time units, and includes channel information of each UE in the time unit, or channel information and a data transmission state of each UE in the time unit. Specific time domain locations of the P2 time units are not limited in this embodiment of this application. For example, the P2 time units may be periodic, or the P2 time units may be consecutive. The time domain locations of the P2 time units may be agreed on in a protocol, or may be notified by the base station to the UE in advance by using signaling. This is not limited.

In a possible scenario, in the foregoing P2 time units, the base station does not know a data transmission state of the UE, and the UE may independently choose whether to transmit the uplink signal A. In a specific time unit, at least one UE in the N1 UEs sends an uplink signal A to the base station, and the base station estimates a data transmission state and channel information of each UE in the N1 UEs based on the received uplink signal A. For example, for each UE in the N1 UEs, if the base station receives the uplink signal A of the UE, it is considered that the data transmission state of the UE is Active. If the base station does not receive the uplink signal A of the UE, it is considered that the data transmission state of the UE is Inactive or Deactivated. If the data transmission state of the UE is Active, because the uplink signal A sent by the UE is known information to the base station and the UE, the base station may estimate the channel information of the UE based on the received uplink signal A. If the data transmission state of the UE is Inactive, a channel response or channel matrix of the UE may be debited as 0.

In a possible scenario, it is agreed on in a protocol or configured in advance by using signaling by the base station that the data transmission state of the UE is Active in the foregoing P2 time units. In a specific time unit, each UE in the N1 UEs sends an uplink signal A to the base station, and the base station estimates channel information of the each UE in the N1 UEs based on the received uplink signal A.

For example, in Mode A2, the training sample set includes P2 training samples. The base station may send a downlink signal A to the foregoing N1 UEs in P2 time units, for the N1 UEs to perform downlink measurement and report measured information to the base station, for the base station to determine the P2 training samples. The downlink signal A is agreed on in a protocol, or is configured in advance by the base station for the UE by using signaling. A type of the downlink signal A may be the same as or different from a type of a reference signal in the reference signal pool determined in this embodiment of this application. This is not limited. For example, the former is a CSI-RS, and the latter is a DMRS of a PDSCH. In the P2 training samples, each training sample corresponds to one time unit in the P2 time units, and includes channel information of each UE in the time unit, or channel information and a data transmission state of each UE in the time unit. Specific time domain locations of the P2 time units are not limited in this embodiment of this application. For example, the P2 time units may be periodic, or the P2 time units may be consecutive. The time domain locations of the P2 time units may be agreed on in a protocol, or may be notified by the base station to the UE in advance by using signaling. This is not limited.

In a possible scenario, in the foregoing P2 time units, the UE does not know whether the base station sends data, and the base station may independently choose whether to transmit the downlink signal A. In a specific time unit, the base station sends a downlink signal A to at least one UE in the N1 UEs. Each UE estimates a data transmission state and channel information of the UE based on the received downlink signal A. For example, for each UE in the N1 UEs, if the UE receives the downlink signal A of the UE, it is considered that the data transmission state of the UE is Active. If the UE does not receive the downlink signal A of the UE, it is considered that the data transmission state of the UE is Inactive or Deactivated. The UE may report its own data transmission state and channel information to the base station. If the data transmission state of the UE is Active, because the downlink signal A sent by the base station is known information to the base station and the UE, the UE may estimate channel information of the UE based on the received downlink signal A. If the data transmission state of the UE is Inactive, a channel response or channel matrix of the UE may be debited as 0.

In a possible scenario, it is agreed on in a protocol or configured in advance by using signaling by the base station that the data transmission state of the UE is Active in the foregoing P2 time units. In a specific time unit, each UE in the N1 UEs receives a downlink signal A from the base station, and estimates channel information of the UE based on the received downlink signal A. The UE may report its own data transmission apparatus and channel information to the base station.

In Mode A2, after determining the first reference signal pool, the base station may indicate the first reference signal to the first UE from the first reference signal pool through the first information. The same as Mode A1, optionally, the first information includes a sequence value of the first reference signal or a compressed value of a sequence value, or the first information indicates an offset value of the first reference signal relative to a reference signal previously configured for the first UE.

Mode A3: The base station and the N1 UEs jointly train the first neural network online, to obtain the first reference signal pool.

The base station and the N1 UEs may obtain, through a first process, a reference signal allocated to each UE in the N1 UEs. A reference signal allocated to the first UE is the first reference signal. The base station may allocate N1 first reference signals to the N1 UEs in total, and the N1 first reference signals may be collectively considered as a first reference signal pool. That the base station determines the N1 first reference signals may be understood as that the base station determines the first reference signal pool.

In an embodiment, the first process includes one or more of the following operations 1 to 4, and every operations 1 to 4 may be considered as an iteration process.

Operation 1: Each UE in the N1 UEs sends a reference signal to the base station. The base station intends to receive N1 reference signals from the foregoing N1 UEs, where each UE corresponds to one reference signal.

For any UE in the N1 UEs, the base station may receive a reference signal of the UE, or may not receive a reference signal of the UE. This is not limited. For one UE, if the UE sends a reference signal, but the base station does not receive the reference signal, it is considered that a missing detection occurs on a base station side.

In a first process, when operation 1 is performed for the first time, an initial reference signal is configured for each UE in the N1 UEs. The initial reference signal may be agreed on in a protocol, or may be separately configured in advance by the base station for each UE in the N1 UEs by using signaling, or may be a reference signal allocated to each UE when the first process is performed last time. This is not limited.

Operation 2: The base station updates configuration information of the N1 reference signals through the first neural network based on information about the received reference signals. In the operation, updated reference signals of the N1 reference signals may be obtained.

The first neural network in Mode A3 is similar to the first neural network in Mode A1. In the foregoing Mode A1, both the neural network encoder and the neural network decoder shown in FIG. 5 are located on a network side. Mode A3 differs from Mode A1 in that, in Mode A3, the neural network encoder is located on the network side, and the decoder is located on UE side. The decoder on the UE side may be a conventional non-AI decoder, or may be a neural network decoder. This is not limited.

Optionally, the first neural network updates the configuration information of the N1 reference signals based on a difference between the reference signal received by the base station and the output of the neural network encoder of the first neural network, for example, an MSE therebetween. This embodiment of this application does not limit an internal algorithm of the first neural network, for example, does not limit a method for updating a reference signal by the first neural network.

Operation 3: The base station indicates an updated reference signal of each UE to at least one UE in the N1 UEs.

For example, after the base station determines a new reference signal of each UE, if the reference signal of the UE is updated, the base station sends, to the UE through the first information, configuration information of the new reference signal corresponding to the UE. Otherwise, the configuration information of the new reference signal corresponding to the UE does not need to be sent to the UE because the reference signal of the UE does not change. In related embodiments of this application, the base station may send the updated reference signal to the UE through RRC signaling, a MAC CE, or DCI. Using DCI as an example, if the UE receives the DCI indicating the updated reference signal, the UE updates the reference signal of the UE based on the DCI. Otherwise, the UE does not need to update the reference signal of the UE.

For example, the first information indicates the new reference signal to the first UE.

The same as Mode A2, optionally, the first information includes a sequence value of the first reference signal or a compressed value of a sequence value, or the first information indicates an offset value of the first reference signal relative to a reference signal previously configured for the first UE. The first reference signal may be a new reference signal of the first UE.

For example, the new reference signal of the first UE is $a_{new}=a_{old}+\Delta a$, where $a_{old}$ indicates an old reference signal or a current reference signal of the first UE, that is, the reference signal sent by the first UE to the base station in operation 1. When receiving configuration information of the new reference signal, the UE updates the current reference signal of the first UE based on the configuration information.

Operation 4: The base station stops the first process when determining that a first condition is met. Otherwise, operation 1 is performed.

Optionally, the first condition includes: In the first process, a quantity of times of performing operation 1, operation 2, or operation 3 meets a threshold requirement. For example, if the base station determines that the quantity of times of performing operation 1, operation 2, or operation 3 is greater than or equal to a threshold, the base station stops the first process. Otherwise, operation 1 is performed. The quantity of times of performing operation 1, operation 2, or operation 3 is equal to a quantity of iterations in the first process. An initial value of the quantity of iterations is 0, and the quantity of iterations is increased by 1 each time operation 1, operation 2, operation 3, or an operation is performed.

Optionally, the first condition includes: Duration of the first process meets a threshold requirement. For example, if the base station determines that the duration of the first process is greater than or equal to a threshold, the base station stops the first process or exits the first process. Otherwise, operation 1 is performed.

For UE, if the UE sends a reference signal but the base station does not receive the reference signal, it is considered that a missing detection occurs on the base station side. If the UE does not send a reference signal, but the base station receives the reference signal of the UE, it is considered that a false alarm occurs on the base station side.

In each operation 1 of the first process, each UE in the N1 UEs sends a reference signal to the base station, and a missing detection rate on the base station side may be determined in duration from a start of the first process to a current time. For example, the missing detection rate may be denoted as T2/T1. When the first process starts, initial values of T1 and T2 are both equal to 0, T1 represents a quantity of transmissions of the reference signal, and T2 represents a quantity of undetected reference signals. Each time operation 1 is performed, T1 is increased by N1. In each operation 2, if the base station does not receive the reference signal of the UE in operation 1, T2 is increased by 1.

Optionally, the first condition includes: T1 meets a threshold requirement. For example, if the base station determines that T1 is greater than or equal to a threshold, the base station stops the first process. Otherwise, operation 1 is performed.

Optionally, the first condition includes: T2 meets a threshold requirement. For example, if the base station determines that T2 is greater than or equal to a threshold, the base station stops the first process. Otherwise, operation 1 is performed.

Optionally, the first condition includes: The foregoing missing detection rate meets a threshold requirement. For example, if the base station determines that the missing detection rate is greater than or equal to a threshold, the base station stops the first process. Otherwise, operation 1 is performed.

In an embodiment, the first process includes one or more times of the following operations 1 to 4, and every operations 1 to 4 may be considered as one iteration process.

Operation 1: At least one UE in the N1 UEs sends a reference signal to the base station. The base station intends to receive N1 reference signals from the foregoing N1 UEs, where each UE corresponds to one reference signal.

In practice, for any UE in the N1 UEs, the UE may send a reference signal to the base station, or may not send a reference signal. This is not limited. For any UE in the N1 UEs, the base station may receive a reference signal of the UE, or may not receive a reference signal of the UE. This is not limited.

An initial reference signal of each UE is the same as that in the descriptions in the first embodiment. Details are not described again.

Operation 2: The base station updates configuration information of the N1 reference signals through the first neural network based on information about the received reference signals. In the operation, updated reference signals of the N1 reference signals may be obtained.

Operation 2 is the same as that in the descriptions in the first possible implementation. Details are not described again.

Operation 3: The base station indicates an updated reference signal of each UE to at least one UE in the N1 UEs.

Operation 3 is the same as that in the descriptions in the first embodiment. Details are not described again.

Operation 4: The base station stops the first process when determining that a first condition is met. Otherwise, operation 1 is performed.

As described in the descriptions in the first embodiment, optionally, the first condition includes: In the first process, a quantity of times of performing operation 1, operation 2, or operation 3 meets a threshold requirement.

As described in the first embodiment, optionally, the first condition includes: Duration of the first process meets a threshold requirement.

Optionally, each iteration process of the first process may further include operation 5. Operation 5: Each UE in the N1 UEs sends third information to the base station. The third information indicates whether a reference signal for a corresponding UE is transmitted in operation 1.

The base station may determine, based on the third information, a missing detection rate and/or a false alarm rate on a base station side in duration from a start of the first process to a current time. For example, the missing detection rate may be denoted as T2/T1, and the false alarm rate may be denoted as T3/T1. When the first process starts, initial values of T1, T2, and T3 are all equal to 0, T1 represents a quantity of transmissions of the reference signals, T2 represents a quantity of undetected reference signals, and T3 represents a quantity of falsely alarmed reference signals. If third information of any UE indicates that the UE sends a reference signal in operation 1, T1 is increased by 1. If any UE indicates that the UE sends a reference signal in operation 1, but the base station does not receive the reference signal of the UE in operation 1, T2 is increased by 1. If any UE indicates that the UE does not send a reference signal in operation 1, but the base station receives a reference signal of the UE in operation 1, T3 is increased by 1. After the first process is stopped or the first process is exited, the N1 UEs have N1 current reference signals in total. The N1 reference signals constitute the first reference signal pool.

In the foregoing method provided in this embodiment of this application, the base station may allocate and configure a reference signal of each UE for the N1 UEs. As described above, the first neural network may further output information about reference signal groups in the first reference signal pool. For example, in a training process of the first neural network, the training parameter for training the first reference signal pool includes grouping information of reference signals in the reference signal pool, for example, a quantity of groups, or a quantity of groups and a quantity of reference signals included in each group of reference signals. In this case, in addition to outputting the first reference signal pool, the first neural network may further output which reference signals in the first reference signal pool are included in each group in first reference signal groups. Alternatively, the first neural network outputs which reference signals included in each first reference signal group, and the reference signals in each first reference signal groups may be combined as the first reference signal pool. A correlation value of intra-group reference signals is low, for example, lower than a threshold. A correlation value of inter-group reference signals may be high relative to a correlation value of intra-group reference signals. Alternatively, this is not limited. In this case, when allocating reference signals to a plurality of UEs, the base station may allocate different reference signals in a same group to the different UEs that are close to each other or have strong interference. The method helps the base station distinguish between uplink signals of different UEs.

A method for the base station to determine grouping of the N1 UEs, and a method for allocating reference signals from the first reference signal pool to the N1 UEs based on the grouping are the same as those in detailed descriptions in the foregoing Mode A1.

That is, the method in FIG. 4 may further include S404: Each UE in the N1 UEs sends first feature information of the UE to the base station. Alternatively, the method in FIG. 4 includes: The base station measures or determines first feature information of the N1 UEs. The first feature information of the N1 UEs includes one or more of the following information of each UE in the N1 UEs: service feature information, data transmission state information, channel information, and location information. For detailed descriptions of S404, refer to the foregoing descriptions. Details are not described herein again.

The base station may determine one or more of the following information based on the first feature information of the N1 UEs: a quantity of UEs, a quantity of UE groups, and/or a quantity of UEs in each group of UEs. For a specific method, refer to the foregoing Mode A1. Details are not described again.

Optionally, the method in FIG. 4 may further include S405 and S406. An execution sequence of steps in the method in FIG. 4 is not limited in this embodiment of this application. For example, the following S405 and S402 occur in a same time unit. For another example, the following S406 and S403 occur in a same time unit.

S405: The base station sends second information to a second UE, where the second information indicates a second reference signal allocated to the second UE. The second reference signal is included in the first reference signal pool, and the second UE is included in the foregoing N1 UEs.

In an embodiment, the first reference signal and the second reference signal belong to a same reference signal group in the first reference signal pool. A scenario to which the method is applicable includes: The first UE and the second UE belong to a same UE group in the N1 UEs.

In an embodiment, the first reference signal and the second reference signal belong to different reference signal groups in the first reference signal pool. A scenario to which the method is applicable includes: The first UE and the second UE do not belong to a same UE group in the N1 UEs.

S406: The second UE sends uplink preconfigured grant transmission to the base station on a second resource in a second time unit. The uplink preconfigured grant transmission includes a second PUSCH and a second reference signal. Correspondingly, the base station receives a second PUSCH and a second reference signal from the second UE on the second resource.

The second resource and the first resource in S403 may be the same, or may be different. The first resource and the second resource are preconfigured resources shared by the first UE and the second UE. For example, the shared resources configured by the base station for the N1 UEs include a plurality of resources, for example, include the first resource and the second resource. Therefore, in any one of the resources, when UE has uplink data, the UE may send a PUSCH on the resource, or when the UE does not have uplink data, the UE may not send a PUSCH on the resource. This is not limited.

The second resource may be a time-frequency resource. If the base station detects or receives the second reference signal on the second resource, the base station considers that transmission of the second UE is detected. Because the base station knows the second reference signal sent by the second UE, the base station may perform channel estimation based on the known second reference signal sent by the second UE and the second reference signal received by the base station, and receive the second PUSCH based on a result of the channel estimation.

Optionally, in the foregoing methods provided in this embodiment of this application, the base station may further receive capability information from the first UE and/or the second UE. Capability information of UE may indicate whether the UE supports the method for configuring a reference signal provided in this embodiment of this application. If the capability information indicates that the UE supports the method, the base station and the UE may configure a reference signal for the UE by using the method.

In the foregoing embodiments provided in this application, the methods provided in embodiments of this application are respectively described from perspectives of an access network device (for example, a base station), an AI node, a terminal device (for example, UE), and interaction between devices. To implement functions in the methods provided in the foregoing embodiment of this application, each device may include a hardware structure and/or a software module, and implement the foregoing functions in a form of the hardware structure, the software module, or a combination of the hardware structure and the software module. Whether one of the foregoing functions is performed in the manner of a hardware structure, a software module, or a hardware structure and a software module depends on a specific application and design constraints of the technical solutions.

Figure 9:
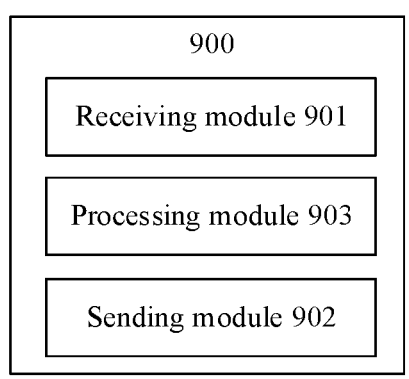
FIG. 9 and FIG. 10 are schematic diagrams of structures of an apparatus according to an embodiment of this application.

FIG. 9 is an example diagram of a structure of an apparatus 900 according to an embodiment of this application.

In an embodiment, the apparatus 900 is configured to implement a function of a terminal device in the foregoing methods. The apparatus may be a terminal device, or may be another apparatus that can implement a function of a terminal device. The another apparatus can be installed in a terminal device or can be used in a manner of matching a terminal device.

The apparatus 900 includes a receiving module 901, configured to receive a signal or information, for example, configured to receive first information from an access network device.

The apparatus 900 includes a sending module 902, configured to send a signal or information, for example, configured to send a reference signal and/or a PUSCH to the access network device.

In an embodiment, the apparatus 900 is configured to implement a function of an access network device in the foregoing methods. The apparatus may be an access network device, or may be another apparatus that can implement a function of an access network device. The another apparatus can be installed in an access network device or can be used in a manner of matching an access network device.

The apparatus 900 includes a receiving module 901, configured to receive a signal or information, for example, configured to receive a reference signal and/or a PUSCH from a terminal device.

The apparatus 900 includes a sending module 902, configured to send a signal or information, for example, configured to send first information to the terminal device.

Similar to the foregoing descriptions, in another possible implementation, the apparatus 900 is configured to implement a function of an AI node in the foregoing methods. The apparatus may be an AI node, or may be another apparatus that can implement a function of an AI node. The another apparatus can be installed in an AI node or can be used in a manner of matching the AI node.

The apparatus 900 includes a receiving module 901, configured to receive a signal or information, for example, configured to receive data from an access network device.

The apparatus 900 includes a sending module 902, configured to send a signal or information, for example, configured to send information of a reference signal to the access network device.

In the foregoing embodiments, optionally, the apparatus 900 includes a processing module 903, configured to process a received signal or received information, for example, configured to decode the signal or the information received by the receiving module 901. The processing module 903 may further generate a to-be-sent signal or to-be-sent information, for example, configured to generate the signal or the information to be sent through the sending module 902.

In embodiments of this application, module division is illustrative, and is a logical function division. During actual implementation, another division manner may be used. For example, the receiving module 901 and the sending module 902 may be integrated into a transceiver module or a communication module. In addition, functional modules in embodiments of this application may be integrated into one module, or may exist alone physically, or two or more foregoing modules are integrated into one module. The integrated module may be implemented in a form of hardware, or may be implemented in a form of a software functional module.

Figure 10:
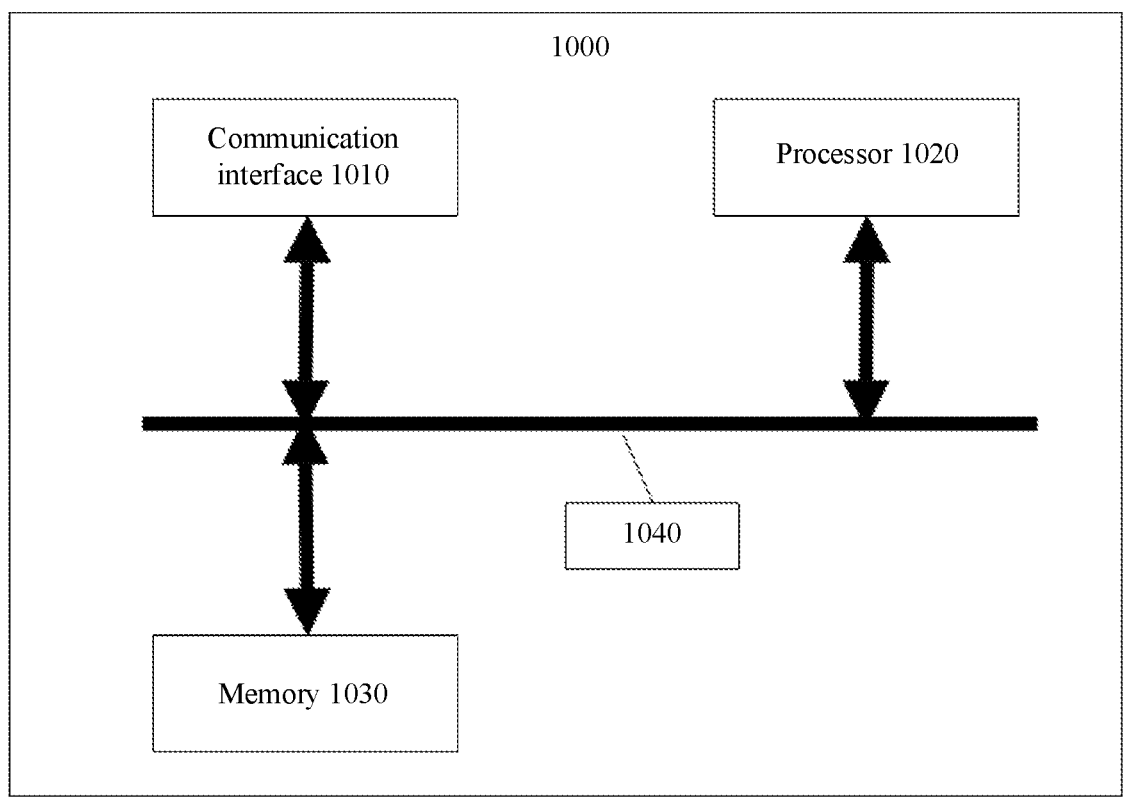

FIG. 10 shows an apparatus 1000 according to an embodiment of this application.

In an embodiment, the apparatus 1000 is configured to implement a function of a terminal device in the foregoing methods. The apparatus may be a terminal device, or may be another apparatus that can implement a function of a terminal device. The another apparatus can be installed in a terminal device or can be used in a manner of matching a terminal device. For example, the apparatus 1000 may be a chip system. In this embodiment of this application, the chip system may include a chip, or may include a chip and another discrete component. The apparatus 1000 includes at least one processor 1020, configured to implement a function of a terminal device in the methods provided in embodiments of this application. For example, the processor 1020 may generate and send a reference signal and/or a signal such as a PUSCH, and may be configured to receive and process first information or the like. For details, refer to detailed descriptions in method examples. Details are not described herein again.

In an embodiment, the apparatus 1000 is configured to implement a function of an access network device in the foregoing methods. The apparatus may be an access network device, or may be another apparatus that can implement a function of an access network device. The another apparatus can be installed in an access network device or can be used in a manner of matching an access network device. For example, the apparatus 1000 may be a chip system. The apparatus 1000 includes at least one processor 1020, configured to implement a function of an access network device in the methods provided in embodiments of this application. For example, the processor 1020 may receive and process a reference signal and/or a signal such as a PUSCH, and may be configured to generate and send first information. For details, refer to detailed descriptions in method examples. Details are not described herein again.

In an embodiment, the apparatus 1000 is configured to implement a function of an AI node in the foregoing methods. The apparatus may be an AI node, or may be another apparatus that can implement a function of an AI node. The another apparatus can be installed in an AI node or can be used in a manner of matching the AI node. For example, the apparatus 1000 may be a chip system. The apparatus 1000 includes at least one processor 1020, configured to implement a function of an AI node in the methods provided in embodiments of this application. For example, the processor 1020 may receive and process a signal for implementing an AI function, and may be configured for information about a reference signal. For details, refer to detailed descriptions in method examples. Details are not described herein again.

The apparatus 1000 may further include at least one memory 1030, configured to store program instructions and/or data. The memory 1030 is coupled to the processor 1020. The coupling in this embodiment of this application may be an indirect coupling or a communication connection between apparatuses, units, or modules in an electrical form, a mechanical form, or another form, and is for information exchange between the apparatuses, the units, or the modules. The processor 1020 may cooperate with the memory 1030. The processor 1020 may execute the program instructions stored in the memory 1030. At least one of the at least one memory may be included in the processor 1020.

The apparatus 1000 may further include a communication interface 1010, configured to communicate with another device through a transmission medium, so that an apparatus in the apparatus 1000 can communicate with the another device. The processor 1020 receives and sends a signal through the communication interface 1010, and is configured to implement a function in the foregoing method embodiments.

A specific connection medium between the foregoing communication interface 1010, the processor 1020, and the memory 1030 is not limited in this embodiment of this application. In this embodiment of this application, the memory 1030, the processor 1020, and the transceiver 1010 are connected through a bus 1040 in FIG. 10. The bus is represented through a bold line in FIG. 10. A connection manner of other components is merely an example for description and is not limited thereto. The bus may be classified into an address bus, a data bus, a control bus, and the like. For ease of representation, only one thick line is for representing the bus in FIG. 10, but this does not mean that there is only one bus or only one type of bus.

In this embodiment of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor or any conventional processor or the like. Steps of the methods disclosed with reference to embodiments of this application may be directly performed by a hardware processor, or may be performed through a combination of a hardware in a processor and a software module.

In this embodiment of this application, the memory may be a nonvolatile memory, for example, a hard disk drive (HDD) or a solid-state drive (solid-state drive, SSD), or may be a volatile memory such as a random-access memory (RAM). The memory is any other medium that can be configured to carry or store expected program code in a form of an instruction or a data structure and that can be accessed by a computer, but is not limited thereto. The memory in this embodiment of this application may alternatively be a circuit or any other apparatus that can implement a storage function, and is configured to store the program instructions and/or the data.

The technical solutions provided in this embodiment of this application may be fully or partially implemented through software, hardware, firmware, or any combination thereof. When software is used to implement the embodiments, the technical solutions may be fully or partially implemented in a form of a computer program product. The computer program product includes one or more computer instructions. When the computer program instructions are loaded and executed on the computer, the procedure or functions according to this embodiment of the present invention are fully or partially generated. The computer may be a general-purpose computer, a dedicated computer, a computer network, a network device, a terminal device, or another programmable apparatus. The computer instructions may be stored in a computer-readable storage medium or may be transmitted from a computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device such as a server or a data center, integrating one or more usable media. The usable medium may be a magnetic medium (for example, a floppy disk, a hard disk, or a magnetic tape), an optical medium (for example, a digital video disc (DVD)), a semiconductor medium, or the like.

In embodiments of this application, when there is no logical conflict, the embodiments may be mutually referenced. For example, methods and/or terms in the method embodiments may be mutually referenced, and functions and/or terms in apparatus embodiments may be mutually referenced. For example, functions and/or terms in the apparatus embodiments and the method embodiments may be mutually referenced.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for configuring a reference signal, comprising:
receiving first information from an access network device, wherein the first information indicates a first reference signal allocated to a first terminal device, wherein
the first reference signal is comprised in a first reference signal pool, the first reference signal pool comprises one or more reference signals, and the first reference signal pool is obtained by training a first neural network.

2. The method according to claim 1, wherein
the first information comprises a sequence value of the first reference signal;
the first information comprises a compressed value of a sequence value of the first reference signal;
the first information comprises an offset value of a sequence value of the first reference signal relative to a sequence value of a reference signal previously configured for the first terminal device;
the first information comprises a compressed value of an offset value of a sequence value of the first reference signal relative to a sequence value of a reference signal previously configured for the first terminal device;
the first information indicates an index of the first reference signal pool in M1 reference signal pools and an index of the first reference signal in the first reference signal pool, wherein M1 is an integer greater than or equal to 1; or
the first information indicates an index of the first reference signal pool in M1 reference signal pools, an index of a reference signal group to which the first reference signal belongs in the first reference signal pool, and an index of the first reference signal in the reference signal group, wherein M1 is an integer greater than or equal to 1.

3. The method according to claim 2, wherein the method further comprises:
receiving information about the M1 reference signal pools from the access network device.

4. A method for configuring a reference signal, comprising:
determining a first reference signal pool, wherein the first reference signal pool comprises one or more reference signals, and the first reference signal pool is obtained by training a first neural network; and
sending first information to a first terminal device, wherein the first information indicates a first reference signal allocated to the first terminal device, and the first reference signal is comprised in the first reference signal pool.

5. The method according to claim 4, wherein
the first information comprises a sequence value of the first reference signal;
the first information comprises a compressed value of a sequence value of the first reference signal;
the first information comprises an offset value of a sequence value of the first reference signal relative to a sequence value of a reference signal previously configured for the first terminal device; or
the first information comprises an offset value of a sequence value of the first reference signal relative to a sequence value of a reference signal previously configured for the first terminal device.

6. The method according to claim 4, wherein the determining a first reference signal pool comprises:
determining the first reference signal pool from M1 reference signal pools based on first feature information of N1 terminal devices, wherein the first terminal device is comprised in the N1 terminal devices, the M1 reference signal pools are obtained by training the first neural network, M1 is an integer greater than or equal to 1, and N1 is an integer greater than or equal to 2.

7. The method according to claim 6, wherein
the first information indicates an index of the first reference signal pool in the M1 reference signal pools and an index of the first reference signal in the first reference signal pool; or
the first information indicates an index of the first reference signal pool in the M1 reference signal pools, an index of a reference signal group to which the first reference signal belongs in the first reference signal pool, and an index of the first reference signal in the reference signal group.

8. The method according to claim 6, wherein the method further comprises:
receiving information about the M1 reference signal pools from the access network device.

9. The method according to claim 6, wherein
for each reference signal pool in the M1 reference signal pools, the reference signal pool is obtained by training the first neural network based on a training parameter and a training sample set, wherein
the training parameter comprises one or more of the following parameters: a quantity of reference signals in the reference signal pool, a sequence length of the reference signal in the reference signal pool, a sequence value range of the reference signal in the reference signal pool, grouping information of the reference signal in the reference signal pool, and a performance requirement of the reference signal in the reference signal pool; and
the training sample set comprises P1 training samples, wherein each training sample comprises one or more of the following parameters of each of N2 terminal devices: channel information and a data transmission state, P1 is an integer greater than or equal to 1, and N2 is an integer greater than or equal to 1.

10. The method according to claim 9, wherein
the channel information is agreed on in a standard;
the channel information is obtained through uplink measurement;
the channel information is received from the N2 terminal devices; or
the channel information is obtained through inference by using a second neural network.

11. The method according to claim 6, wherein
the first feature information of the N1 terminal devices comprises one or more of the following information of each terminal device: location information, service feature information, data transmission state information, and channel information.

12. The method according to claim 4, wherein
the first reference signal pool is obtained by training the first neural network based on a training parameter and a training sample set, wherein
the training parameter comprises one or more of the following parameters: a quantity of reference signals in the first reference signal pool, a sequence length of the reference signal in the first reference signal pool, a sequence value range of the reference signal in the first reference signal pool, grouping information of the reference signal in the first reference signal pool, and a performance requirement of the reference signal in the first reference signal pool; and
the training sample set comprises P2 training samples, wherein each training sample comprises one or more of the following parameters of each of N1 terminal devices: channel information and a data transmission state, the first terminal device is comprised in the N1 terminal devices, P2 is an integer greater than or equal to 1, and N1 is an integer greater than or equal to 2.

13. The method according to claim 12, wherein the method further comprises:
receiving an uplink signal from each of the N1 terminal devices, and estimating the channel information of each terminal device in the N1 terminal devices based on the received uplink signal.

14. The method according to claim 4, wherein that the first reference signal pool is obtained by training a first neural network comprises:
the first reference signal pool is obtained through a first process, wherein the first process comprises:
operation 1: receiving N1 reference signals from N1 terminal devices, wherein each terminal device corresponds to one reference signal;
operation 2: determining N1 updated reference signals of the N1 reference signals based on reception information of the N1 reference signals by using the first neural network;
operation 3: separately indicating an updated reference signal of each terminal device to at least one terminal device in the N1 terminal devices; and
operation 4: stopping the first process when it is determined that a first condition is satisfied, wherein the N1 updated reference signals constitute the first reference signal pool; or otherwise, performing operation 1 again.

15. The method according to claim 14, wherein the first condition comprises:
a quantity of iterations of the first process satisfies a threshold requirement;
a duration of the first process satisfies a threshold requirement;
in the first process, a quantity of transmissions of the reference signal satisfies a threshold requirement;
in the first process, a quantity of undetected reference signals satisfies a threshold requirement;
in the first process, a missing detection rate of the reference signal satisfies a threshold requirement;
in the first process, a quantity of falsely alarmed reference signals satisfies a threshold requirement; or
in the first process, a false alarm rate of the reference signal satisfies a threshold requirement.

16. The method according to claim 4, wherein the method further comprises:
sending second information to a second terminal device, wherein the second information indicates a second reference signal allocated to the second terminal device, the second reference signal is comprised in the first reference signal pool, and the first terminal device and the second terminal device are comprised in the N1 terminal devices, wherein
based on the first terminal device and the second terminal device belonging to a same terminal device group in the N1 terminal devices, the first reference signal and the second reference signal belong to a same reference signal group in the first reference signal pool; or
based on the first terminal device and the second terminal device belonging to different terminal device groups in the N1 terminal devices, the first reference signal and the second reference signal belong to different reference signal groups in the first reference signal pool.

17. The method according to claim 16, wherein the method further comprises:
determining a terminal device group corresponding to the N1 terminal devices based on the first feature information of the N1 terminal devices, wherein the first feature information of the N1 terminal devices comprises one or more of the following information of each terminal device: the location information, the service feature information, the data transmission state information, and the channel information.

18. A communication apparatus, comprising a processor and a memory, wherein the memory is coupled to the processor, and the processor is configured to perform the method according to claim 1.

19. A communication apparatus, comprising a processor and a memory, wherein the memory is coupled to the processor, and the processor is configured to perform the method according to claim 4.

20. A communication apparatus, comprising a processor and a communication interface, wherein the processor implements the method according to claim 1 through the communication interface.

* * * * *